US012707160B2

(12) United States Patent
Park et al.

(10) Patent No.: US 12,707,160 B2
(45) Date of Patent: Aug. 11, 2026

(54) IMAGE SENSOR

(71) Applicant: Samsung Electronics Co., Ltd., Suwon-si (KR)

(72) Inventors: Keunjoo Park, Suwon-si (KR); Junseok Kim, Suwon-si (KR); Bongki Son, Suwon-si (KR); Jaeha Park, Suwon-si (KR); Inchun Lim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 84 days.

(21) Appl. No.: 18/585,217

(22) Filed: Feb. 23, 2024

(65) Prior Publication Data

US 2024/0292120 A1 Aug. 29, 2024

(30) Foreign Application Priority Data

Feb. 28, 2023 (KR) ........................ 10-2023-0026909

(51) Int. Cl.
*H04N 25/47* (2023.01)
*H04N 25/587* (2023.01)
*H04N 25/707* (2023.01)

(52) U.S. Cl.
CPC ........... *H04N 25/47* (2023.01); *H04N 25/587* (2023.01); *H04N 25/707* (2023.01)

(58) Field of Classification Search
CPC .... H04N 25/47; H04N 25/587; H04N 25/707; H04N 25/53; H04N 25/58; H04N 25/76; H04N 25/78
USPC .......................................................... 348/308
See application file for complete search history.

(56) References Cited

U.S. PATENT DOCUMENTS 6,215,113 B1 * 4/2001 Chen .................... H04N 25/771 348/E3.018
9,805,287 B2 10/2017 Edpalm et al.
11,006,069 B2 5/2021 Tsukagoshi
11,935,285 B1 * 3/2024 Cao ........................... G06T 5/92
2005/0018927 A1 * 1/2005 Manabe ................. H04N 23/68 382/294
2020/0388016 A1 12/2020 Bak et al.
2022/0311922 A1 9/2022 Mobbs et al.

(Continued)

FOREIGN PATENT DOCUMENTS

JP 6239026 B2 11/2017
KR 10-1823537 B1 1/2018

(Continued)

*Primary Examiner* — Lin Ye
*Assistant Examiner* — Chan T Nguyen
(74) *Attorney, Agent, or Firm* — Harness, Dickey & Pierce, P.L.C.

(57) ABSTRACT

Provided is an image sensor. The image sensor including a plurality of pixels, and processing circuitry configured to, generate first image data by converting optical signals received by each of the plurality of pixels during a first exposure time into electrical signals, generate event data including information related to a change in intensity of the optical signals received by each of the plurality of pixels during the first exposure time, the event data having a frame rate greater than a frame rate of the first image data, receive the first image data and the event data, and generate output data by sequentially packing the first image data and the event data corresponding to the first exposure time.

20 Claims, 11 Drawing Sheets

(56) References Cited

U.S. PATENT DOCUMENTS

| | | | |
|---|---|---|---|
| 2022/0327718 | A1 | 10/2022 | Dutta Choudhury et al. |
| 2022/0329771 | A1 | 10/2022 | Perrone et al. |

FOREIGN PATENT DOCUMENTS

| | | | |
|---|---|---|---|
| KR | 10-2018-0052613 | A | 5/2018 |
| WO | WO-2017-043504 | A1 | 3/2017 |

* cited by examiner

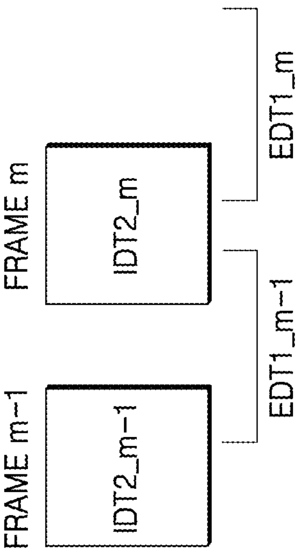
FIG. 6
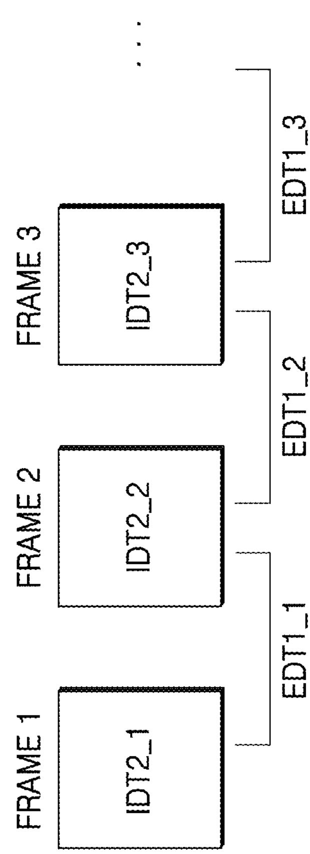

FIG. 10

EIT1

T1 T2 T3 T4 T5 T6 t

EDT1_1 EDT1_2 EDT1_3 EDT1_4 EDT1_5 EDT1_6

EDT

IMAGE SENSOR

CROSS-REFERENCE TO RELATED APPLICATION

This U.S. non-provisional application claims the benefit of priority under 35 U.S.C. § 119 to Korean Patent Application No. 10-2023-0026909, filed on Feb. 28, 2023 in the Korean Intellectual Property office, the disclosure of which is incorporated by reference herein in its entirety.

BACKGROUND

Various example embodiments of the inventive concepts relate to an image sensor for transmitting image data. More particularly, one or more of the example embodiments of the inventive concepts relate to an image sensor for transmitting image data and event data for image processing of the image data, a system including the image sensor, and/or a method for operating the image sensor, etc.

Image sensors are devices which capture two-dimensional and/or three-dimensional images of objects. The image sensors generate images of the objects by using photoelectric conversion elements which react according to intensity of light reflected from the objects. Recently, with the development of the computer industry and the communication industry, demand for image sensors with improved performance has increased in various electronic devices, such as digital cameras, camcorders, personal communication systems (PCS), game devices, security cameras, medical micro-cameras, and mobile phones.

The image sensor may output image data to an image signal processor. As imaging devices support an operation mode providing an image at a high frame speed, such as a slow motion mode and a super slow motion mode, the image sensor may generate and output image data having a high frame rate. When image data is output at a high-speed frame rate, a transmission capacity may be limited and/or a data transmission delay may occur, etc.

Accordingly, a technology for transmitting image data without limitation of transmission capacity is desired and/or required.

SUMMARY

Various example embodiments of the inventive concepts provide an image sensor for generating image data of a low frame rate and event data of a high frame rate, with respect to the image data, sequentially packing and outputting the image data of a low frame rate and the event data of a high frame rate, and thus improving transmission efficiency of the image data and the event data, a system including the image sensor, and/or a method for operating the image sensor, etc.

According to at least one example embodiment of the inventive concepts, there is provided an image sensor including a plurality of pixels, and processing circuitry configured to generate first image data by converting optical signals received by each of the plurality of pixels during a first exposure time into electrical signals, generate event data including information related to a change in intensity of the optical signals received by each of the plurality of pixels during the first exposure time, the event data having a frame rate greater than a frame rate of the first image data, receive the first image data and the event data, and generate output data by sequentially packing the first image data and the event data corresponding to the first exposure time.

According to at least one example embodiment of the inventive concepts, there is provided an image sensor including processing circuitry configured to generate initial image data in units of frames by reading out electrical signals from a pixel array, the pixel array including a plurality of pixels each configured to convert optical signals into the electrical signals, a memory configured to store the initial image data, and the processing circuitry is further configured to, generate first image data based on the initial image data, the generating the first image data including merging the initial image data of each of m sub-frames included in a frame according to a plurality of sub-exposure times included in a first exposure time associated with the frame, wherein m is a positive integer, generate event data corresponding to each of the m sub-frames based on the initial image data corresponding to each of the m sub-frames, and generate output data by sequentially packing the first image data and the event data.

According to at least one example embodiment of the inventive concepts, there is provided an image sensor including a pixel array including at least one complementary metal-oxide semiconductor (CMOS) image sensor (CIS) pixel and at least one dynamic vision sensor (DVS) pixel, the at least one CIS pixel configured to convert optical signals into electrical signals, and the at least one DVS pixel configured to generate event signals by sensing a change in intensity of the optical signals, and processing circuitry configured to, generate first image data based on the electrical signals, the first image data having a first frame rate, generate event data having a second frame rate higher than the first frame rate of the first image data based on the event signals, and generate output data by sequentially packing the first image data and the event data corresponding to an exposure time of the first image data.

BRIEF DESCRIPTION OF THE DRAWINGS

Various example embodiments will be more clearly understood from the following detailed description taken in conjunction with the accompanying drawings in which:

FIG. 6 is a diagram illustrating a method of generating event data, according to at least one example embodiment;

FIG. 10 is a diagram of event data corresponding to a first exposure time, according to at least one example embodiment.

DETAILED DESCRIPTION

Figure 1:
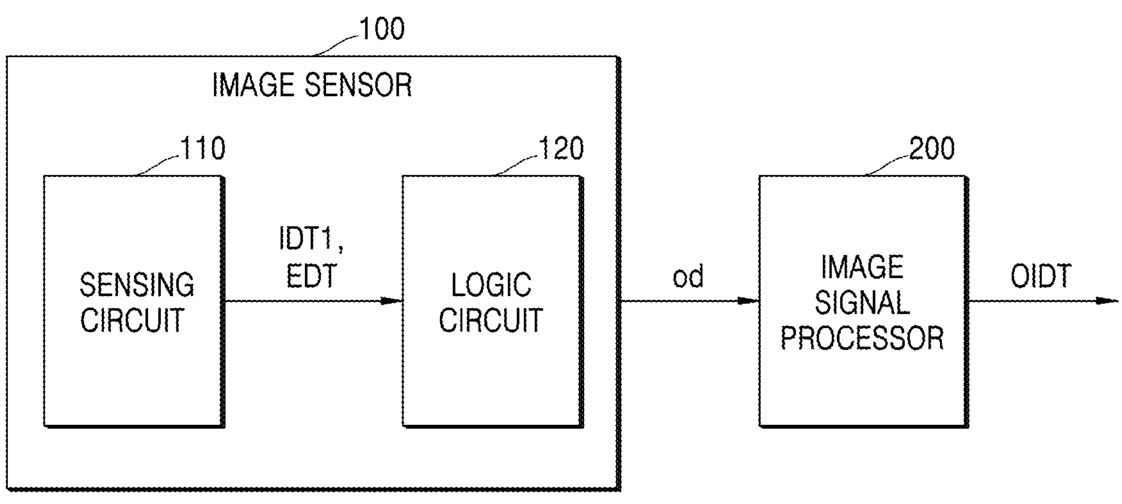
FIG. 1 is a block diagram of an image processing system according to at least one example embodiment.

Hereinafter, various example embodiments of the inventive concepts are described in detail with reference to the accompanying drawings. Identical reference numerals are used for the same constituent elements in the drawings, and duplicate descriptions thereof are omitted.

FIG. 1 is a block diagram of an image processing system 10 according to at least one example embodiment.

The image processing system 10 may be embedded in an electronic device and/or implemented as an electronic device, but the example embodiments are not limited thereto. An electronic device may include a device which photographs an image and/or captures a video, displays an image and/or video, and/or performs an operation based on the image and/or video, and may be implemented as, for example, a personal computer (PC), a server, a vehicle, an Internet of Things (IoT) device, and/or a portable electronic device, but the example embodiments are not limited thereto. The portable electronic device may include a laptop computer, a mobile phone, a smartphone, a tablet, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, etc. In addition, the image processing system 10 may be mounted on an electronic device, such as a drone, an advanced drivers assistance system (ADAS), etc., and/or on an electronic device equipped as a component in a vehicle, furniture, manufacturing facilities, doors, various measurement equipment, etc., but the example embodiments are not limited thereto.

Referring to FIG. 1, the image processing system 10 may include an image sensor 100 and/or an image signal processor 200, etc. The image processing system 10 may further include other components, such as a display, a user interface, etc. The image sensor 100 may include a sensing circuit 110 and/or a logic circuit 120, but is not limited thereto. According to some example embodiments, one or more of the image sensor 100, the image signal processor 200, the sensing circuit 110, and/or the logic circuit 120, etc., may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The image sensor 100 may convert at least one optical signal associated with and/or corresponding to at least one object (e.g., a target of the image, etc.), which is incident through an optical lens, into at least one electrical signal, and generate an image based on the electrical signal. The image sensor 100 may include a plurality of pixels. The plurality of pixels may sense an optical signal from the outside (e.g., an external source), and convert the sensed optical signal into an electrical signal to generate a pixel signal. The image sensor 100 may generate image data based on the electrical signals.

The image sensor 100 may include, for example, a pixel array including a plurality of pixels arranged in two dimensions and a readout circuit, and the pixel array may convert received optical signals into electrical signals, but is not limited thereto. The pixel array may be implemented as a photoelectric conversion element, for example, a charge coupled device (CCD) and/or a complementary metal oxide semiconductor (CMOS), and may be implemented as various types of photoelectric conversion elements.

Each of the plurality of pixels may detect light in a desired and/or certain spectral region (e.g., frequency range). For example, the plurality of pixels may include red color pixels converting light in a red color spectral region into an electric signal, green color pixels converting light in a green color spectral region into an electric signal, and blue color pixels converting light in a blue color spectral region into an electric signal, but the example embodiments are not limited thereto, and for example, pixels of other colors may be included in the plurality of pixels. On an upper portion of each of the plurality of pixels, a color filter for transmitting light in a specific spectrum region may be arranged, and a microlens for light collection may be arranged, but is not limited thereto.

In at least one example embodiment, the plurality of pixels may include CMOS image sensor (CIS) pixels and/or dynamic vision sensor (DVS) pixels, etc. The CIS pixel may convert an optical signal into an electrical signal to generate an image signal, and the DVS pixel may generate an event signal by sensing an intensity change of an optical signal. In other words, the DVS pixel may sense an event, that is a change in light intensity, and output an event signal based on the sensed event.

The sensing circuit 110 may generate first image data IDT1 and/or event data EDT. The sensing circuit 110 may generate event data EDT at a first frame rate (e.g., a desired first frame rate). The sensing circuit 110 may generate first image data IDT1 at a second frame rate (e.g., a desired second frame rate). The first frame rate may have a speed higher than the second frame rate, but is not limited thereto. The first frame rate may also be referred to as a high frame rate (e.g., in comparison to the second frame rate), and the second frame rate may also be referred to as a low frame rate (e.g., in comparison to the first frame rate). For example, the image data may include red/green/blue (RGB) data representing the color of the image, and the event data may include data representing a change in the light intensity of the image, but the example embodiments are not limited thereto. The sensing circuit 110 may transmit the first image data IDT1 and/or the event data EDT to the logic circuit 120, etc.

The sensing circuit 110 may convert at least one optical signal received by each of the plurality of pixels into at least one electrical signal during a first exposure time (e.g., a first frame), and generate the first image data IDT1. The sensing circuit 110 may convert at least one optical signal of an object entered through the optical lens into at least one electrical signal, generate raw data (e.g., initial image data, etc.) based on the electrical signal provided by a pixel array, and output the raw data as the first image data IDT1 and/or output the raw data in which at least one pre-processing operation, such as bad pixel removal, etc., has been performed, as the first image data IDT1.

The sensing circuit 110 may generate the first image data IDT1 based on a first image signal obtained by exposing the photoelectric conversion element during the first exposure time. The sensing circuit 110 may generate the first image data IDT1 of the main frame corresponding to the first exposure time. In other words, the sensing circuit 110 may generate the first image data IDT1 of the main frame based on the first image signal obtained during the first exposure time.

In at least one example embodiment, the sensing circuit 110 may generate a plurality of image data having different luminance with respect to the same object. The first exposure time may include a plurality of sub exposure times, but is not limited thereto. The first exposure time may correspond to the main frame, and the plurality of sub-exposure times may respectively correspond to a plurality of sub-frames. The sensing circuit 110 may generate second image data of each of the plurality of sub-frames in sub-frame units according to and/or based on each of the plurality of sub-exposure times included in the first exposure time.

The sensing circuit 110 may generate a second image signal by converting at least one optical signal received by each of the plurality of pixels during each of the plurality of sub-exposure times included in the first exposure time into at least one electrical signal, and may generate second image data of each of the plurality of sub-frames based on the second image signal, etc. For example, the first exposure time includes the plurality of sub-exposure times, and the sensing circuit 110 may generate the second image signal for each of the plurality of sub-exposure times and generate the second image data of each of the plurality of sub-frames respectively corresponding to the plurality of sub-exposure times based on the second image signal, but the example embodiments are not limited thereto. The second image data may be generated at a frame rate higher than that of the first image data IDT1, but is not limited thereto. For example, the sensing circuit 110 may generate the second image data at the first frame rate, etc.

The sensing circuit 110 may generate the first image data IDT1 based on the second image data of each of the plurality of sub-frames. The sensing circuit 110 may generate the first image data IDT1 by merging at least a portion (e.g., a subset) of the second image data of each of the plurality of sub-frames. For example, the sensing circuit 110 may generate the first image data IDT1 of the main frame by summing the values of the second image data of each of the plurality of sub-frames, but is not limited thereto. The sensing circuit 110 may generate the first image data IDT1 by merging the second image data of each of the plurality of sub-frames. The first exposure time may include the plurality of sub-exposure times, and the sensing circuit 110 may merge (e.g., combine, add, etc.) the second image data of each of the plurality of sub-frames respectively corresponding to the plurality of sub-exposure times, etc.

The sensing circuit 110 may merge the second image data of each of the plurality of sub-frames, and may generate the first image data IDT1 exposed during the first exposure time. The sensing circuit 110 may generate the first image data IDT1 of a low frame rate by merging the second image data of a high frame rate, but is not limited thereto.

The sensing circuit 110 may also generate event data EDT. The sensing circuit 110 may generate the event data EDT including information related to and/or corresponding to a change in intensity of at least one optical signal incident on each of the plurality of pixels during the first exposure time, etc. The sensing circuit 110 may generate the first image data IDT1 based on at least one optical signal received by each of the plurality of pixels during the first exposure time, and may generate the event data EDT based on an event which occurred and/or was sensed during the first exposure time.

In at least one example embodiment, when the image sensor 100 includes the DVS pixel, the sensing circuit 110 may generate event data by using the DVS pixel, etc. The DVS pixel may detect a change in intensity of incident light and output an event signal corresponding to the change in intensity of incident light, etc. When an event occurs in which the intensity of light increases in comparison to the preceding event, the DVS pixel may output an on-event signal corresponding thereto. To the contrary, when an event occurs in which the intensity of light decreases in comparison to the preceding event, the DVS pixel may output an off-event signal.

The sensing circuit 110 may generate the event data EDT in units of sub-frames based on the event signal, but the example embodiments are not limited thereto. The sensing circuit 110 may generate the event data EDT including information related to and/or corresponding to an event occurring during the first exposure time in units of sub-frames at every desired and/or preset time point (e.g., desired time intervals, etc.). For example, the sensing circuit 110 may generate the event data EDT including information related to and/or corresponding to an event occurring during the first exposure time in units of sub-frames shorter than the main frames. Because the sensing circuit 110 generates the event data EDT at a high-speed frame rate in units of sub-frames at every desired and/or preset time point during the first exposure time, the event data EDT of a high frame rate may be generated. The sensing circuit 110 may scan the DVS pixels at every desired and/or preset cycle and output the event data EDT, but the example embodiments are not limited thereto. The sensing circuit 110 may not output the event signals for all DVS pixels, and may only output the event signals for pixels in which a change in light intensity is detected, etc.

Additionally, in at least one example embodiment, the image sensor 100 may also include only CIS pixels, but is not limited thereto. The sensing circuit 110 may generate the second image data of each of the plurality of sub-frames in sub-frame units based on the plurality of sub-exposure times included in the first exposure time. The second image data may be generated at a frame rate higher than that of the first image data IDT1, but is not limited thereto. The sensing circuit 110 may generate the event data EDT based on the second image data. The sensing circuit 110 may generate the event data EDT of each of the plurality of sub-frames based on the second image data of each of the plurality of sub-frames, etc. Because the sensing circuit 110 generates the event data EDT of each of the plurality of sub-frames, the event data EDT of a high frame rate greater than the frame rate of the first image data IDT1 may be generated, but the example embodiments are not limited thereto.

The sensing circuit 110 may, based on the reference frame, generate the event data EDT in the target frame of the plurality of sub-frames from which the event data EDT is to be generated. The reference frame may include a frame continuous with the target frame. For example, when a first sub-frame and a second sub-frame are sequential, the reference frame of the first sub-frame may include the second sub-frame, etc.

The sensing circuit 110 may generate the event data EDT of each of the plurality of sub-frames based on the second image data of at least one reference frame continuous and/or sequential with each of the plurality of sub-frames among the plurality of sub-frames. The sensing circuit 110 may generate the event data EDT based on a difference (e.g., a light intensity difference, a luminous value difference, etc.) between pixels included in the second image data of the reference frame and the pixels included in the second image data of the target frame. For example, the sensing circuit 110 may generate the event data EDT of the first sub-frame based on a difference between the second image data of the first sub-frame, which is the target frame, and the second image data of the second sub-frame, which is the reference frame, but the example embodiments are not limited thereto.

The sensing circuit 110 may transmit the first image data IDT1 and/or the event data EDT to the logic circuit 120, etc. The first image data IDT1 and/or the event data EDT corresponding to the first exposure time may be transmitted to the logic circuit 120. The event data EDT corresponding to the first exposure time may include the event data EDT of each of the plurality of sub-frames described above. The sensing circuit 110 may transmit, to the logic circuit 120, the first image data IDT1 of the low frame rate and/or the event data EDT of the high frame rate, but the example embodiments are not limited thereto.

The logic circuit 120 may receive the first image data IDT1 and/or the event data EDT, etc. The logic circuit 120 may generate output data od by packing (e.g., combining, adding, etc.) the first image data IDT1 and the event data EDT. The logic circuit 120 may sequentially pack the first image data IDT1 corresponding to the first exposure time and the event data EDT corresponding to the first exposure time, and generate the output data od based on the sequentially packed first image data IDT1 and the event data EDT, etc.

For example, the logic circuit 120 may pack in the listed order, the first image data IDT1 and the event data EDT corresponding to the first exposure time. However, the example embodiments are not necessarily limited thereto, and the logic circuit 120 may pack the event data EDT and the first image data IDT1 in the listed order, etc. The output data od is described in greater detail in connection to FIG. 2.

The logic circuit 120 may transfer the output data od to the outside (e.g., an external destination) of the image sensor 100. For example, the logic circuit 120 may deliver the output data od to external devices (for example, an image signal processor (ISP) 200, an application processor (AP), or the like) via an interface circuit, but the example embodiments are not limited thereto. The interface circuit may exchange the output data od with an external device based on a desired and/or preset protocol. For example, the interface circuit may include an address event representation (AER) interface, a mobile industry processor interface (MIPI) interface, and/or a parallel interface, etc. The logic circuit 120 may transfer the output data od to the image signal processor 200, etc.

The image signal processor 200 may be implemented as hardware or a combination of hardware and software (and/or firmware). The image signal processor 200 may be implemented as one of various types of processors capable of performing image processing, such as a graphics processing unit (GPU), a digital signal processor (DSP), and/or an image signal processor (ISP), etc. The image signal processor 200 may be implemented as a single chip, and/or may be embedded in an AP, etc., but is not limited thereto.

The image signal processor 200 may generate an output image data OIDT by performing at least one image processing operation on the output data od. The image signal processor 200 may perform image processing on received image. In this case, image processing may include various processes, such as processing to improve image quality, for example, noise removal, brightness adjustment, and/or sharpness adjustment, or the like, image size change processing, and/or image processing to change data format (for example, changing image data of Bayer pattern to YUV and/or RGB format), etc.

For example, the image signal processor 200 may reduce noise of the received image data and/or may perform an image processing operation for improving image quality, such as gamma correction, color filter array interpolation, color matrix, color correction, and/or color enhancement, etc. In addition to the image processing operation described above, the image signal processor 200 may also further perform on the image data crosstalk correction, a despeckle operation, high dynamic range (HDR) processing, and/or a sharpening operation, etc., on the full image data. In addition, for example, the image signal processor 200 may also further perform an image processing operation, such as auto dark level compensation (ADLC), bad pixel correction, and/or lens shading correction, etc., on the image data.

The image signal processor 200 may receive the first image data IDT1 and/or the event data EDT. The image signal processor 200 may perform an image processing operation on the first image data IDT1. The image signal processor 200 may perform an image processing operation on the first image data IDT1 by using the event data EDT, but the example embodiments are not limited thereto.

Due to the movement of the object photographed by the image sensor 100, the movement of the image sensor 100 itself, and/or the movement of the image processing system 10 itself, blurring (e.g., motion blur, etc.) may occur in the image data having a relatively low frame rate. For example, when at least one second image data of each of a plurality of frames is merged to generate the first image data IDT1, blurring may occur in the first image data IDT1.

The image signal processor 200 may perform an image deblurring processing on the first image data IDT1 by using the event data EDT. The image signal processor 200 may effectively apply an algorithm (for example, a complementary metal-oxide semiconductor (CMOS) image sensor (CIS) deblur algorithm) to remove motion blur from the first image data IDT1, but the example embodiments are not limited thereto.

Figure 2:
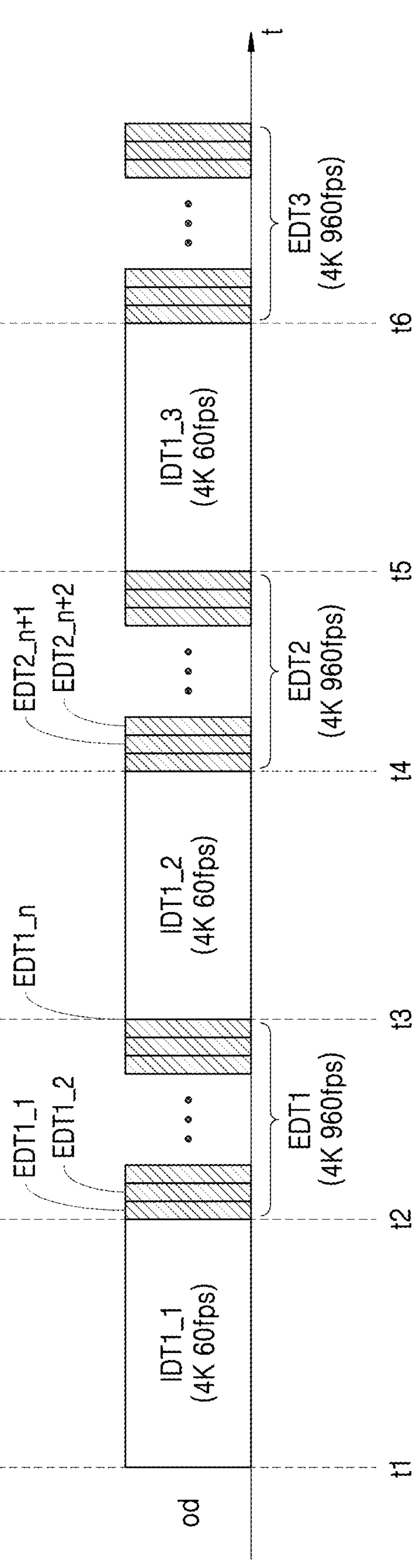
FIG. 2 is a diagram of output data according to at least one example embodiment.

FIG. 2 is a diagram of output data according to at least one example embodiment. Duplicate descriptions of the descriptions given above are omitted.

Referring to FIG. 2, the output data od may include first image data, e.g., IDT1_1, IDT1_2, and IDT1_3, etc., and a plurality of event data, e.g., first through third entire event data EDT1 through EDT3, etc., but the example embodiments are not limited thereto. The logic circuit (for example, the logic circuit 120 in FIG. 1) may sequentially pack the corresponding first image data and the corresponding event data.

The first image data IDT1_1 may be generated based on at least one optical signal received by each of the plurality of pixels during the first exposure time. The first image data IDT1_1 may correspond to the first exposure time (and/or may correspond to an image frame corresponding to the first exposure time, etc.). The first entire event data EDT1 may be generated based on a change in intensity of at least one optical signal incident on each of the plurality of pixels during the first exposure time (e.g., the first frame). The first entire event data EDT1 may include information related to and/or corresponding to an event having occurred during the first exposure time. The first entire event data EDT1 may correspond to the first exposure time (e.g., the first frame, etc.).

The first entire event data EDT1 may include first event data generated in and/or corresponding to each of the plurality of sub-frames included in the first frame, etc. For example, the first entire event data EDT1 may include first through $n^{th}$ event data EDT1_1 through EDT**1_*n*. Each of the first through $n^{th}$ event data EDT1_1 through EDT1_*n* may include information related to and/or corresponding to an event occurred during the sub-exposure time corresponding to each of the plurality of sub-frames. Each of the first through $n^{th}$ event data EDT1_1 through EDT1_$n$ may include information related to and/or corresponding to an event occurred in a time interval corresponding to each of the first through $n^{th}$ event data EDT1_1 through EDT1_$n$. A sum of the sub-exposure times respectively corresponding to the first through $n^{th}$ event data EDT1_1 through EDT1_$n$ may be equal to the first exposure time. For example, the first image data IDT1_1 may be generated based on the first exposure time of related to and/or corresponding to 16 ms, but the example embodiments are not limited thereto. Each of the first through $n^{th}$ event data EDT1_1 through EDT1**_$n$ may be generated based on related to and/or corresponding to 1 ms, but the example embodiments are not limited thereto.

The logic circuit may sequentially pack the first image data IDT1_1 and the first entire event data EDT1. The logic circuit may transmit the first image data IDT1_1 from a first time point t1, and transmit the first entire event data EDT1 from a second time point t2. However, the example embodiments are not necessarily limited thereto, and the first entire event data EDT1 may be transmitted first and then, the first image data IDT1_1 may also be transmitted. For example, the logic circuit may sequentially pack the first image data IDT1_1 of related to and/or corresponding to 60 frames per second (fps) and the first entire event data EDT1 of related to and/or corresponding to 960 fps, but the example embodiments are not limited thereto.

The first image data IDT1_2 may be generated based on optical signals received by each of the plurality of pixels during the second exposure time. The plurality of pixels may be exposed during the first exposure time and then exposed during a second exposure time, etc. The length of the first exposure time and the length of the second exposure time may be the same as or different from each other also. The first image data IDT1_2 may correspond to the second exposure time, but is not limited thereto. The second entire event data EDT2 may include information related to and/or corresponding to at least one event which occurred during the second exposure time. The second entire event data EDT2 may correspond to the second exposure time, but is not limited thereto.

The second entire event data EDT2 may include second event data corresponding to each of the plurality of sub-frames, and each of the plurality of sub-frames may respectively correspond to the plurality of sub-exposure times included in the second exposure time, etc. The logic circuit may sequentially pack the first image data IDT1_2 and the second entire event data EDT2. The logic circuit may transmit the first image data IDT1_2 from a third time point t3, and transmit the second entire event data EDT2 from a fourth time point t4. However, the example embodiments are not necessarily limited thereto, and the second entire event data EDT2 may be transmitted first, and then, the first image data IDT1_2 may also be transmitted, etc. For example, the logic circuit may sequentially pack the second image data IDT1_2 of related to and/or corresponding to 60 fps and the second entire event data EDT2 of related to and/or corresponding to 960 fps, but the example embodiments are not limited thereto.

The first image data IDT1_3 may be generated based on optical signals received by each of the plurality of pixels during a third exposure time. The plurality of pixels may be exposed during the second exposure time and then exposed during the third exposure time, but are not limited thereto. The length of the second exposure time and the length of the third exposure time may be the same as or different from each other. The first image data IDT1_3 may correspond to the third exposure time. A third entire event data EDT3 may correspond to the third exposure time.

The third entire event data EDT3 may include third event data corresponding to each of the plurality of sub-frames, and each of the plurality of sub-frames may correspond to the plurality of sub-exposure times included in the third exposure time, etc. The logic circuit may sequentially pack the first image data IDT1_3 and the third entire event data EDT3. The logic circuit may transmit the first image data IDT1_3 from a fifth time point t5, and transmit the third entire event data EDT3 from a sixth time point t6. However, the example embodiments are not necessarily limited thereto, and the third entire event data EDT3 may be transmitted first, and then, the first image data IDT1_3 may also be transmitted, etc. For example, the logic circuit may sequentially pack the first image data IDT1_3 of related to and/or corresponding to 60 fps and the third entire event data EDT3 of related to and/or corresponding to 960 fps, but the example embodiments are not limited thereto.

Figure 3:
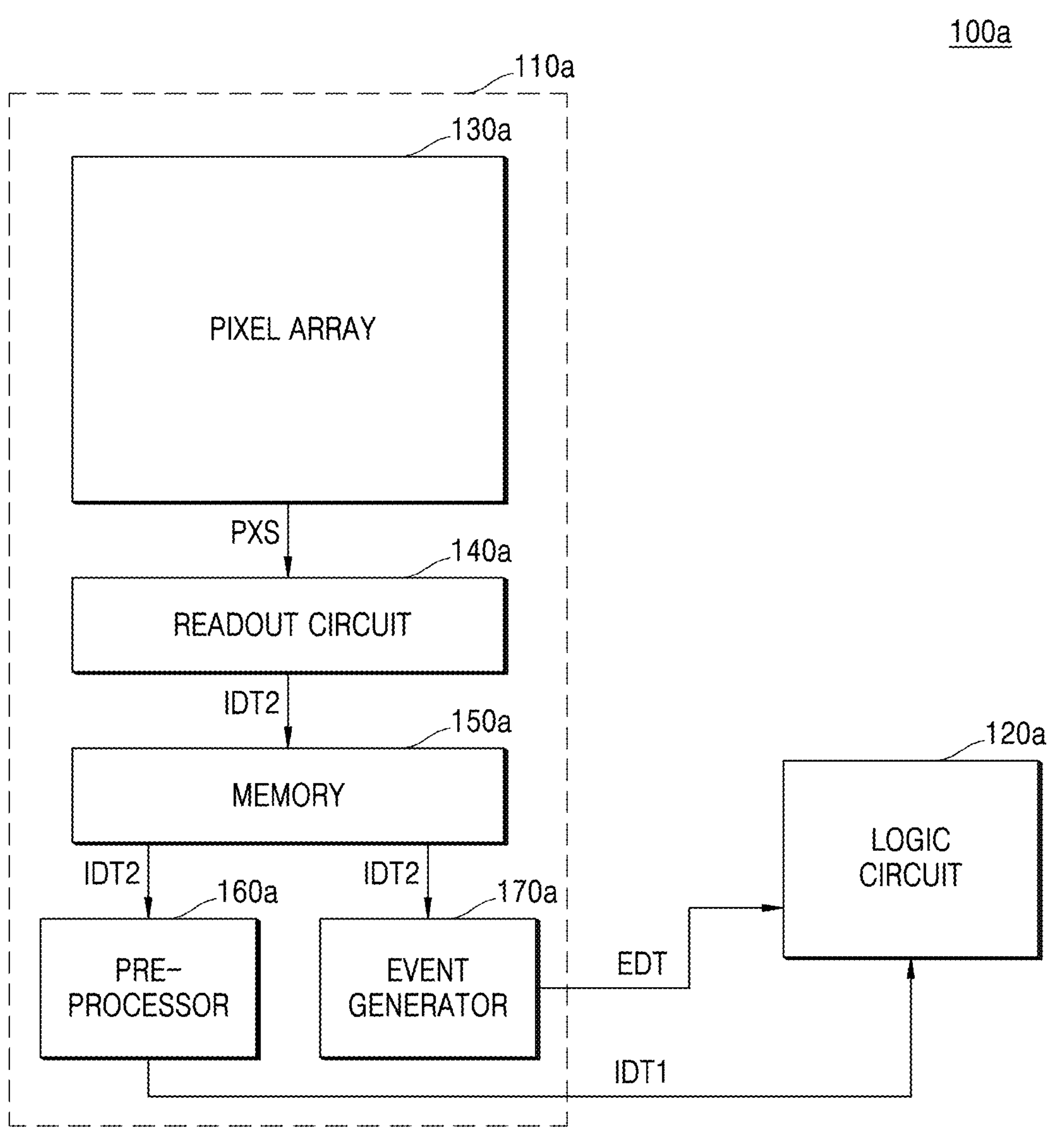
FIG. 3 is a block diagram of an image sensor according to at least one example embodiment.

FIG. 3 is a block diagram of an image sensor 100*a* according to at least one example embodiment. The image sensor 100*a*, a sensing circuit 110*a*, and a logic circuit 120*a* in FIG. 3 respectively correspond to the image sensor 100, the sensing circuit 110, and the logic circuit 120 in FIG. 1, and thus, duplicate descriptions thereof are omitted. However, the example embodiments are not limited thereto and the image sensor of one or more example embodiments may have a different configuration.

Referring to FIG. 3, the image sensor 100*a* may include the sensing circuit 110*a* and the logic circuit 120*a*. The sensing circuit 110*a* may include a pixel array 130*a*, a readout circuit 140*a*, a memory 150*a*, a pre-processor 160*a*, and an event generator 170*a*. However, the example embodiments is not necessarily limited thereto, and other components may be further included as desired and/or necessary. In addition, the sensing circuit 110*a* may also not include the memory 150*a* as desired and/or necessary. According to some example embodiments, one or more of the image sensor 100*a*, sensing circuit 110*a*, the logic circuit 120*a*, the readout circuit 140*a*, the memory 150*a*, the pre-processor 160*a*, and/or the event generator 170*a*, etc., may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The pixel array 130*a* may include a plurality of pixels. The plurality of pixels may include one or more CIS pixels, but is not limited thereto. The pixel array 130*a* may generate pixel signals PXS by converting optical signals received by each of the plurality of pixels into electrical signals. The readout circuit 140*a* may generate second image data IDT2, etc. The readout circuit 140*a* may generate the second image data IDT2 corresponding to each of the plurality of sub-frames in sub-frame units based on each of the plurality of sub-exposure times included in the first exposure time, but is not limited thereto. For example, the readout circuit 140*a* may generate the second image data IDT2 corresponding to each of m (m is a positive integer) sub-frames based on the first exposure time, etc. The readout circuit 140*a* may generate the second image data IDT2 of a high frame rate, but is not limited thereto. The pixel array 130*a* and the readout circuit 140*a* are described below in detail with reference to FIG. 4.

The memory 150*a* may store the second image data IDT2 corresponding to each of the plurality of sub-frames generated based on the first exposure time. The memory 150*a* may be implemented as a volatile memory, such as dynamic random access memory (RAM) (DRAM) and/or static RAM (SRAM), etc., and/or a resistive memory, such as resistive RAM (ReRAM) and magnetic RAM (MRAM), etc., but the example embodiments are not limited thereto.

The pre-processor 160*a* may receive at least a portion (e.g., subset) of the second image data IDT2 corresponding to each of the plurality of sub-frames. The pre-processor 160*a* may receive the second image data IDT2 corresponding to each of the plurality of sub-frames from the memory 150*a*, but is not limited thereto. The pre-processor 160*a* may merge at least a portion of the second image data IDT2 corresponding to each of the plurality of sub-frames to generate the first image data IDT1.

The pre-processor 160*a* may generate the first image data IDT1 by merging the second image data IDT2 corresponding to each of the plurality of sub-frames generated based on the first exposure time. The first exposure time may include the plurality of sub-exposure times, and the pre-processor 160*a* may merge the second image data IDT2 corresponding to the plurality of sub-frames, and the plurality of sub-frames may respectively correspond to the plurality of sub-exposure times, etc. The second image data IDT2 of the plurality of sub-frames respectively corresponding to the plurality of sub-exposure times included in the first exposure time may include the second image data IDT2 corresponding to each of the plurality of sub-frames generated based on the first exposure time, etc. The sum of plurality of sub-exposure times may be equal to the first exposure time.

The pre-processor 160*a* may merge the second image data IDT2 corresponding to each of the plurality of sub-frames, and generate the first image data IDT1 exposed during the first exposure time, etc. The pre-processor 160*a* may merge the second image data IDT2 corresponding to each of m sub-frames and generate the first image data IDT1, etc. The pre-processor 160*a* may generate the first image data IDT1 having a low frame rate by merging the second image data IDT2 having a high frame rate, but the example embodiments are not limited thereto.

The event generator 170*a* may receive at least a portion (e.g., subset) of the second image data IDT2 corresponding to each of the plurality of sub-frames. The event generator 170*a* may receive the second image data IDT2 corresponding to each of the plurality of sub-frames from the memory 150*a*, etc. The event generator 170*a* may generate the event data EDT corresponding to each of the plurality of sub-frames based on the second image data IDT2 corresponding to each of the plurality of sub-frames. The event generator 170*a* may generate the event data EDT of a high frame rate corresponding to each of the plurality of sub-frames based on the second image data IDT2 having a high frame rate, etc.

The event generator 170*a* may, based on the reference frame, generate the event data EDT corresponding to the target frame of the plurality of sub-frames from which the event data EDT is to be generated. The reference frame may include a frame continuous (e.g., sequential) with the target frame. For example, when the first sub-frame and the second sub-frame are sequential, the reference frame of the first sub-frame may include the second sub-frame, etc. For example, the event generator 170*a* may generate event data EDT corresponding to each of m sub-frames by using the second image data IDT2 corresponding to each of the m sub-frames, etc.

The event generator 170*a* may generate the event data EDT corresponding to each of the plurality of sub-frames based on the second image data IDT2 generated from at least one reference frame continuous (e.g., sequential) with each of the plurality of sub-frames. The event generator 170*a* may generate the event data EDT based on a difference (e.g., change and/or differences in pixel values, etc.) between the second image data IDT2 corresponding to the reference frame and the second image data IDT2 corresponding to the target frame. For example, the event generator 170*a* may generate the event data EDT of the target frame based on the difference in pixel values between the second image data IDT2 corresponding to the first sub-frame, which is the target frame, and the pixel values of the second image data IDT2 corresponding to the second sub-frame, which is the reference frame, but is not limited thereto.

The logic circuit 120*a* may receive the first image data IDT1 and the event data EDT, etc. The logic circuit 120*a* may sequentially pack the first image data IDT1 and the event data EDT corresponding to each of the plurality of sub-frames corresponding to the first exposure time, and may generate output data, etc. For example, the logic circuit 120*a* may sequentially pack both the first image data IDT1 of a low frame rate and the event data EDT of a high frame rate of each of m sub-frames, but the example embodiments are not limited thereto.

Figure 4:
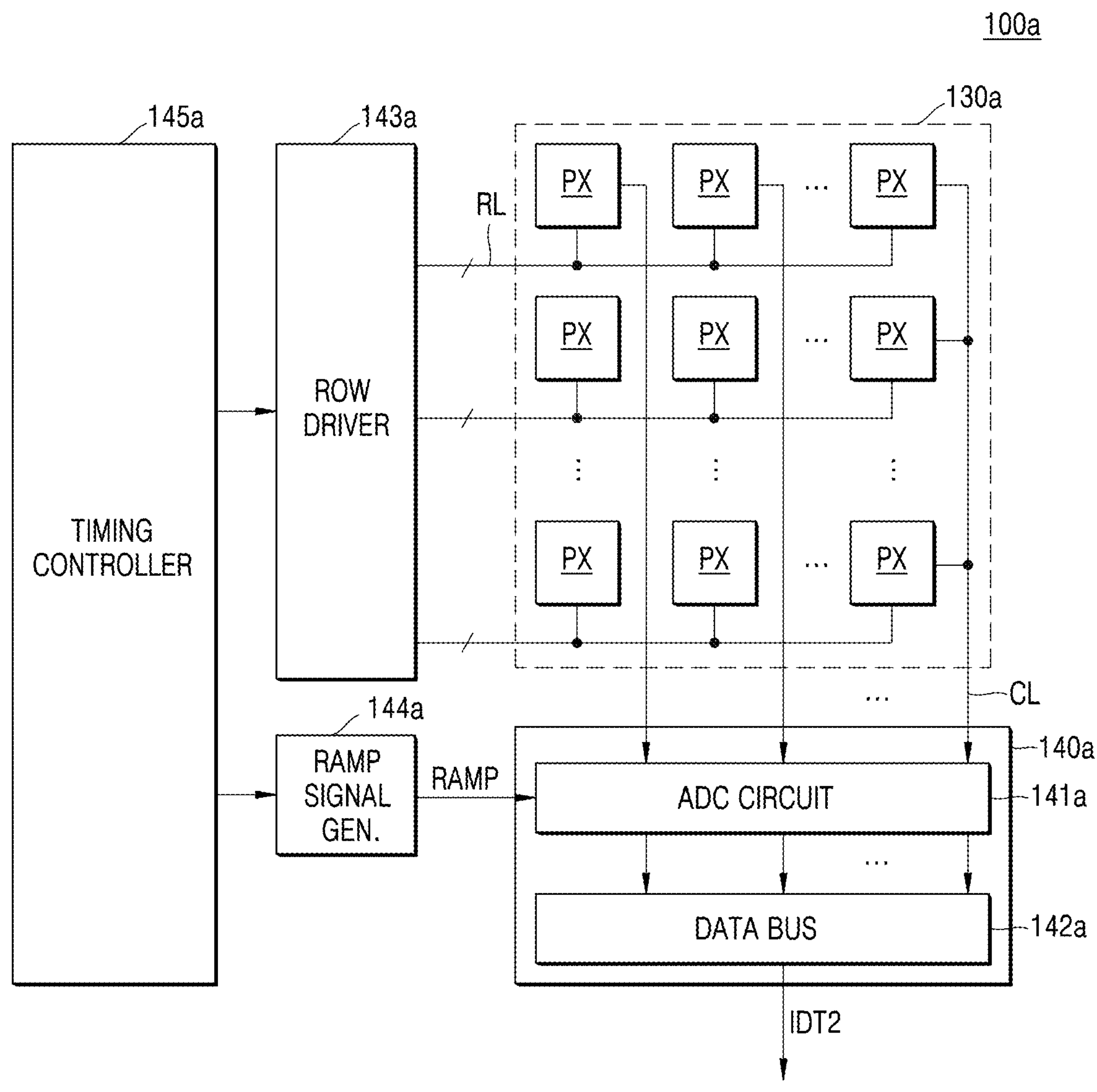
FIG. 4 is a block diagram of a portion of an image sensor, according to at least one example embodiment.

FIG. 4 is a diagram of a portion of the image sensor 100*a*, according to at least one example embodiment. Duplicate descriptions given with reference to FIG. 3 are omitted.

Referring to FIG. 4, the image sensor 100*a* may include the pixel array 130*a*, a row driver 143*a*, a readout circuit 140*a*, a ramp signal generator 144*a*, and/or a timing controller 145*a*, etc., and the readout circuit 140*a* may include an analog-to-digital conversion circuit (141*a*, hereinafter, referred to as an ADC circuit) and/or a data bus 142*a*, etc. According to some example embodiments, one or more of the image sensor 100*a*, the row driver 143*a*, the readout circuit 140*a*, the ramp signal generator 144*a*, the timing controller 145*a*, the readout circuit 140*a*, the ADC circuit 141*a*, and/or the data bus 142*a*, etc., may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The pixel array 130*a* may be connected to a plurality of row lines RL and a plurality of column lines CL, and may include a plurality of pixels PX arranged in an array, but is not limited thereto. The pixel array 130*a* may include a plurality of CIS pixels, etc. In at least one example embodiment, the plurality of pixels PX may include active pixel sensors (APS), etc.

Each of the plurality of pixels PX may include at least one photoelectric conversion element, and the pixel PX may detect light by using the photoelectric conversion element and output image signals that include electrical signals according to and/or based on the sensed light. For example, the photoelectric conversion element may include a photo-sensing element including an organic material and/or an inorganic material, such as an inorganic photo diode, an organic photo diode, a perovskite photo diode, a photo transistor, a photo gate, and/or a pinned photo diode, etc. In at least one example embodiment, each of the plurality of pixels PX may include a plurality of photoelectric conversion elements, etc.

Additionally, one or more microlenses for reducing condensation may be arranged on an upper portion of each of the plurality of pixels PX and/or on each of pixel groups including adjacent pixels PX, etc. Each of the plurality of pixels PX may detect light in a particular spectrum region from light received by the microlens. For example, the pixel array 130*a* may include red pixels PX converting light in a red spectral region into an electric signal, green pixels PX converting light in a green spectral region into an electric signal, and blue pixels PX converting light in a blue spectral region into an electric signal, etc., but the example embodiments are not limited thereto. A color filter for transmitting light in a particular spectrum region may be arranged on each of the plurality of pixels PX, but the example embodiments are not limited thereto. However, the example embodiments are not limited thereto, and the pixel array 130*a* may include pixels converting light from other spectrum regions in addition to red, green, and blue colors into electrical signals, etc.

In some example embodiments, the plurality of pixels PX may have a multi-layer structure. The pixel PX having a multi-layer structure may include a stacked plurality of photoelectric conversion elements which convert light of different spectrum regions into electrical signals, and may generate electrical signals corresponding to different colors from the plurality of photoelectric conversion elements, etc. In other words, electrical signals corresponding to a plurality of colors may be output by a single pixel PX.

A color filter array for transmitting light in a particular spectrum region may be arranged on one or more of the plurality of pixels PX, and a color that a corresponding pixel detects according to and/or based on a color filter arranged on each of the plurality of pixels PX may be determined. However, the example embodiments are not limited thereto, and in at least one example embodiment, in the case of a particular photoelectric conversion element, light in a particular wavelength band may be converted into an electrical signal depending on and/or based on the level of the electrical signal applied to the photoelectric conversion element, etc. The pixel PX may include two or more photoelectric conversion elements, etc.

Each of the plurality of pixels PX may generate the pixel signal PXS. For example, each of the plurality of pixels PX may generate the pixel signal PXS during each of the plurality of sub-exposure times included in the first exposure time, etc. The pixel signal PXS may be generated in response to (e.g., during each of) the plurality of sub-exposure times. For example, the first exposure time may include a first sub-exposure time, a second sub-exposure time, and a third sub-exposure time, etc.

A row driver 143*a* may drive the pixel array 130*a* in row units. The row driver 143*a* may decode a row control signal (for example, an address signal) received from the timing controller 145*a*, and in response to the decoded row control signal, may select at least one of row lines included in the pixel array 130*a*. For example, the row driver 143*a* may generate a selection signal selecting one of a plurality of rows. In addition, the pixel array 130*a* may output the pixel signal PXS from the row selected by the selection signal provided by the row driver 143*a*.

The row driver 143*a* may transmit control signals for outputting the pixel signal PXS to the pixel array 130*a*, and the pixel PX may output the pixel signal PXS by operating in response to the control signals. For example, the row driver 143*a* may generate control signals controlling the pixel PX to operate in a plurality of modes during the readout period, and provide the generated control signals to the pixel array 130*a*, but the example embodiments are not limited thereto.

The ramp signal generator 144*a* may generate a ramp signal RAMP that increases and/or decreases at a certain slope, and provide the ramp signal RAMP to the ADC circuit 141*a* of the readout circuit 140*a*, etc.

The readout circuit 140*a* may read out the pixel signal PXS from the pixels PX on a selected row by the row driver 143*a* of the plurality of pixels PX. In this case, the pixel signal PXS may include a reset signal and/or an image signal (and/or a sensing signal). The readout circuit 140*a* may generate the second image data IDT2, by converting reset signals and image signals received from the pixel array 130*a* via the plurality of column lines CL into digital signals based on the ramp signal RAMP from the ramp signal generator 144*a*, but the example embodiments are not limited thereto.

The readout circuit 140*a* may convert the pixel signal PXS corresponding to each of the plurality of sub-frames to generate the second image data IDT2 corresponding to each of the plurality of sub-frames, etc. For example, the readout circuit 140*a* may generate the second image data IDT2 corresponding to the first sub-frame based on the pixel signal PXS corresponding to the first sub-exposure time. For example, the readout circuit 140*a* may generate the second image data IDT2 corresponding to the second sub-frame based on the pixel signal PXS of the sub-frame corresponding to the second sub-exposure time, etc.

The ADC circuit 141*a* may include a plurality of ADCs respectively corresponding to the plurality of column lines CL, and each of the plurality of ADCs may compare each of the reset signal and image signal received via the corresponding column line CL with the ramp signal RAMP, and generate the second image data IDT2 based on the comparison results, but the example embodiments are not limited thereto. The second image data IDT2 of each of the plurality of sub-frames generated by the ADC circuit 141*a* may be output via a data bus 142*a*, etc.

Figure 5:
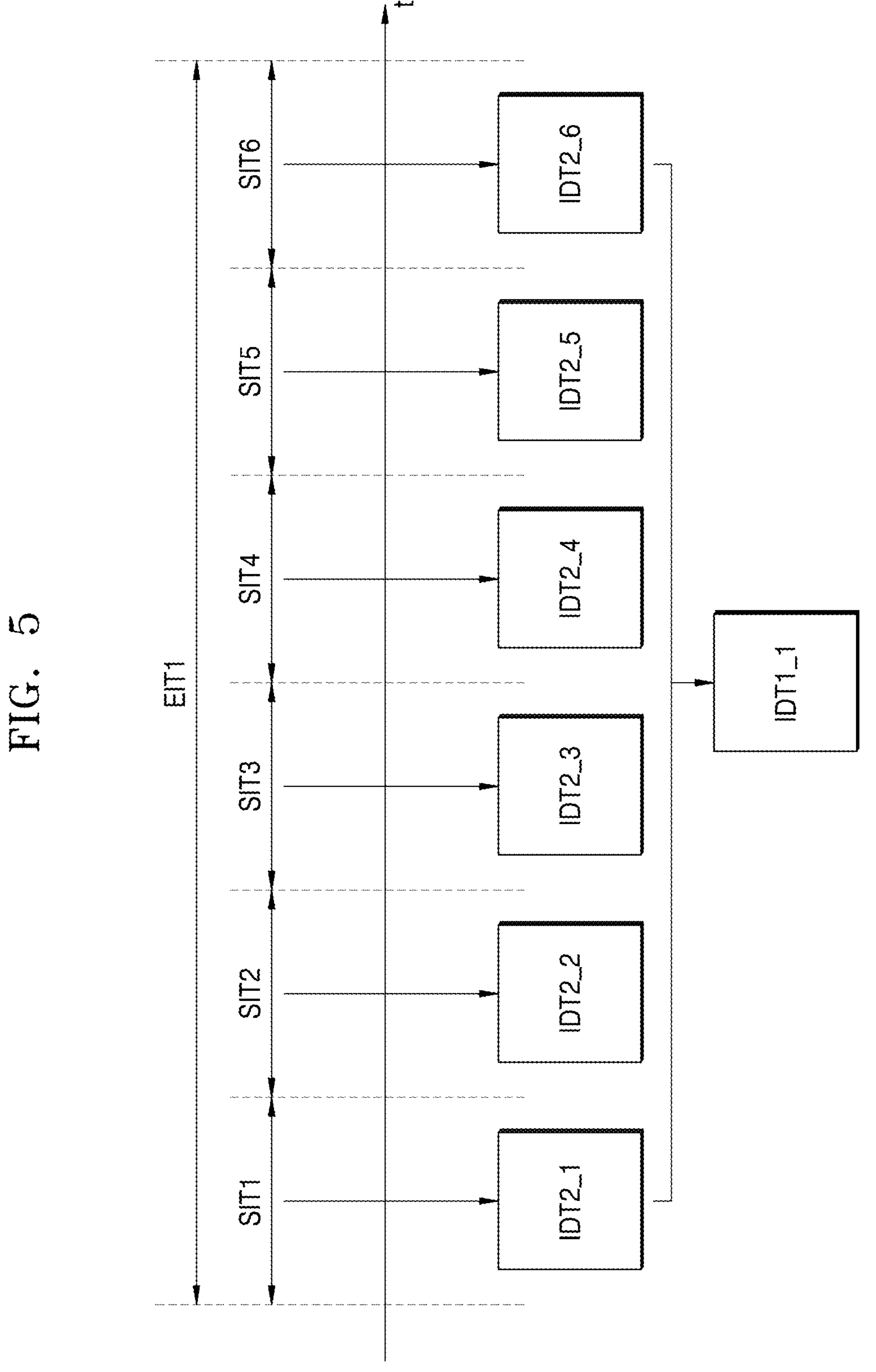
FIG. 5 is a diagram illustrating a method of generating first image data, according to at least one example embodiment.

FIG. 5 is a diagram of a method of generating the first image data IDT1_1, according to at least one example embodiment. Hereinafter, FIG. 5 and FIG. 3 will be discussed together, but the example embodiments are not limited thereto. The sensing circuit 110*a* may generate the first image data IDT1_1, etc. The pre-processor 160*a* may generate the first image data IDT1_1, etc.

Referring to FIG. 5, a first exposure time EIT1 may include a plurality of sub-exposure times. The first exposure time EIT1 may include first through sixth sub-exposure time SIT1 through SIT6, but is not limited thereto. Although FIG. 5 illustrates that the first exposure time EIT1 includes six sub-exposure times, the example embodiments are not limited thereto, and may include various numbers of sub-exposure times. Each of the first through sixth sub-exposure time SIT1 through SIT6 may be the same length of time. However, the example embodiments are not necessarily limited thereto, and each of the first through sixth sub-exposure time SIT1 through SIT6 may be different lengths of time from each other or at least two of the sub-exposure times may also have the same length of time, etc.

The sensing circuit 110*a* may generate the second image data IDT2, etc. The sensing circuit 110*a* may generate the second image data IDT2 corresponding to the sub-frames corresponding to each of the plurality of sub-exposure times. The sensing circuit 110*a* may generate the second image data IDT2_1 corresponding to the first sub-frame corresponding to a first sub-exposure time SIT1, etc. The sensing circuit 110*a* may generate the second image data IDT2_2 corresponding to the second sub-frame corresponding to a second sub-exposure time SIT2, etc. The sensing circuit 110*a* may generate the second image data IDT2_3 corresponding to the third sub-frame corresponding to a third sub-exposure time SIT3, etc. The sensing circuit 110*a* may generate the second image data IDT2 corresponding to each of the plurality of sub-frames of a high frame rate during the first exposure time, but the example embodiments are not limited thereto.

The pre-processor 160*a* may receive at least a portion (e.g., subset) of the second image data IDT2 corresponding to each of the plurality of sub-frames. The pre-processor 160*a* may merge (e.g., combine, etc.) at least a portion of the second image data IDT2 corresponding to each of the plurality of sub-frames to generate the first image data IDT1, etc. The pre-processor 160*a* may merge the second image data IDT2 corresponding to each of the plurality of sub-frames, and generate the first image data IDT1 exposed during the first exposure time and of a low frame rate, but is not limited thereto.

The pre-processor 160*a* may merge the second image data IDT2 corresponding to each of m sub-frames to generate the first image data IDT1. For example, the pre-processor 160*a* may merge the second image data IDT2_1, the second image data IDT2_2, the second image data IDT2_3, the second image data IDT2_4, the second image data IDT2_5, and the second image data IDT2_6 to generate the first image data IDT1_1 corresponding to the first exposure time EIT1, but the example embodiments are not limited thereto. The pre-processor 160*a* may generate the first image data IDT1 of a low frame rate by merging the second image data IDT2 of a high frame rate, but is not limited thereto. The image sensor 100*a* may transmit the first image data IDT1_1 to the outside of (e.g., an external destination to) the image sensor 100*a* without limiting the transmission capacity, by merging the second image data captured of a high frame rate and generating the first image data IDT1_1 of a low frame rate, etc.

FIG. 6 is a diagram illustrating a method of generating the event data EDT, according to at least one example embodiment. Hereinafter, FIG. 6 and FIG. 3 will be discussed together, but the example embodiments are not limited thereto. The sensing circuit 110*a* may generate the event data EDT. The event generator 170*a* may generate the event data EDT.

Referring to FIG. 6, the sensing circuit 110*a* may generate the second image data IDT2. The sensing circuit 110*a* may generate the second image data IDT2 of the sub-frame corresponding to each of the plurality of sub-exposure times included in the first exposure time, but is not limited thereto. The sensing circuit 110*a* may generate the second image data IDT2 of m sub-frames corresponding to each of the plurality of sub-exposure times. The m sub-frames may respectively correspond to the plurality of sub-exposure times included in the first exposure time, but is not limited thereto. The sensing circuit 110*a* may generate the second image data IDT2_1 of the first sub-frame, the second image data IDT2_2 of the second sub-frame, the second image data IDT2_3 of the third sub-frame, . . . , and the second image data IDT2_*m* of the $m^{th}$ sub-frame.

The event generator 170*a* may receive the second image data IDT2 of each of the plurality of sub-frames. The event generator 170*a* may generate the event data EDT of each of the plurality of sub-frames based on the second image data IDT2 of each of the plurality of sub-frames. The event generator 170*a* may generate event data EDT of each of the plurality of subframes based on at least one reference frame continuous (e.g., sequential) with each of the plurality of sub-frames.

The reference frame may include a frame continuous (e.g., sequential) with the target frame. For example, when a first sub-frame and a second sub-frame are sequential, the reference frame of the first sub-frame may include the second sub-frame, etc. The reference frame of the second sub-frame may include a third sub-frame, etc. The reference frame of the $(m-1)^{th}$ sub-frame may include an $m^{th}$ sub-frame.

The event generator 170*a* may generate event data EDT1_1 of the first sub-frame based on the second image data IDT2_1 of the first sub-frame and the second image data IDT2_2 of the second sub-frame, but is not limited thereto. The event generator 170*a* may generate the event data EDT1_1 based on a difference (e.g., change and/or differences in pixel values, etc.) between the second image data IDT2_1 and the second image data IDT2_2, etc.

The event generator 170*a* may generate event data EDT1_2 of the second sub-frame based on the second image data IDT2_2 of the second sub-frame and the second image data IDT2_3 of the third sub-frame, etc. The event generator 170*a* may generate event data EDT1_2 based on a difference (e.g., change and/or differences in pixel values, etc.) between the second image data IDT2_2 and the second image data IDT2_3.

The event generator 170*a* may generate event data EDT1_*m*−1 of the $(m-1)^{th}$ sub-frame based on second image data IDT2_*m*−1 of the $(m-1)^{th}$ sub-frame and second image data IDT2_*m* of the $m^{th}$ sub-frame, but the example embodiments are not limited thereto. The event data of the $m^{th}$ sub-frame may be generated based on second image data of the sub-frame included in the second exposure time following the first exposure time. All of the event data (EDT1_1, EDT1_2, . . . , EDT1_*m*) of respective m sub-frames may be transferred to the logic circuit 120*a* as event data EDT corresponding to the first image data IDT1.

The image sensor 100*a* may generate event data EDT based on the image data. The image sensor 100*a* may generate the accurate event data EDT of each sub-frame by generating the event data EDT based on the difference (e.g., change and/or differences in pixel values, etc.) between the sub-frames. In addition, the image sensor 100*a* may increase the transmission capacity by packing and transmitting image data and event data EDT at the same time, and the lost information related to and/or corresponding to the image data may be compensated based on the event data EDT.

Figure 7:
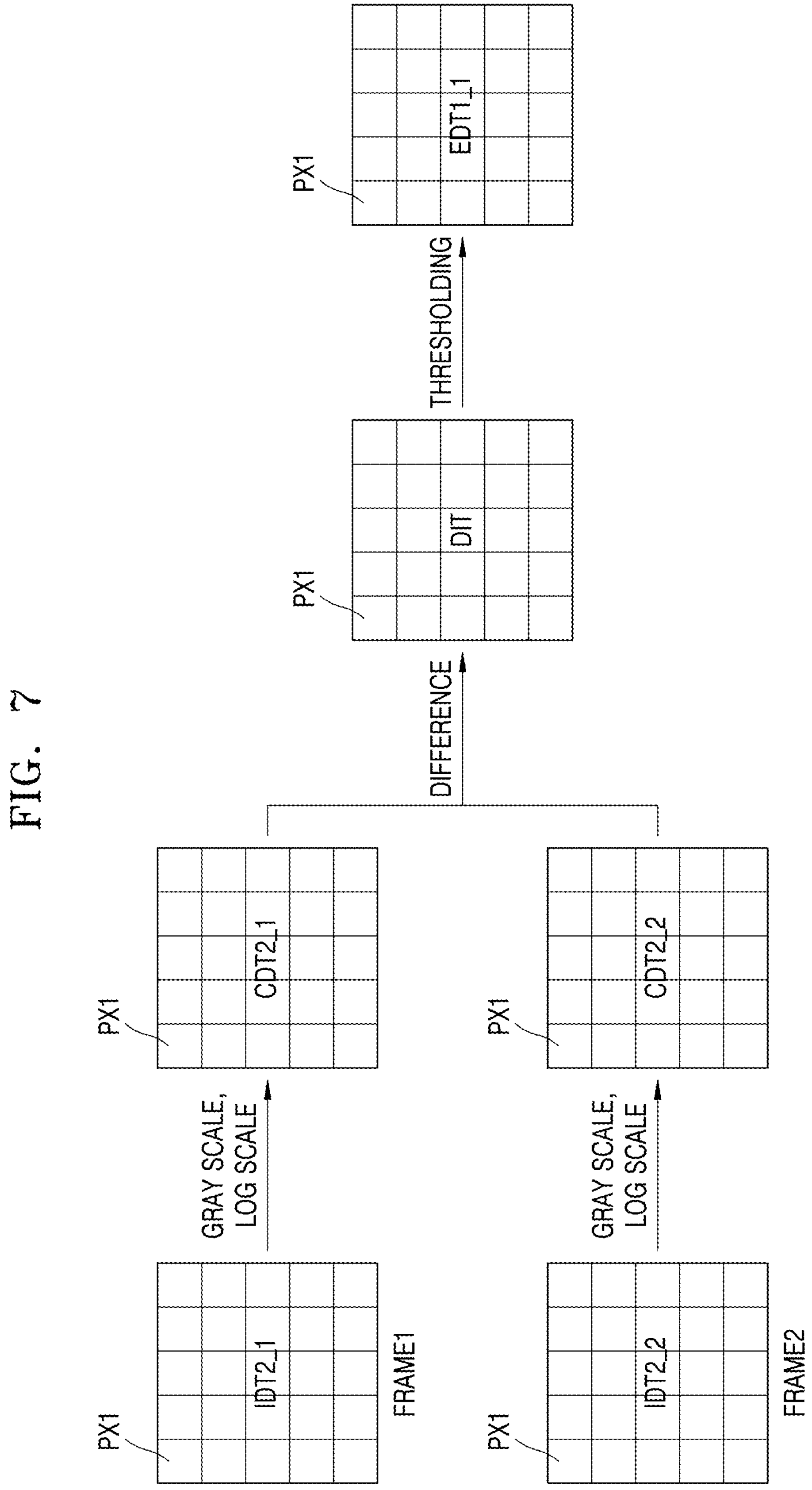
FIG. 7 is a detailed diagram illustrating a method of generating event data, according to at least one example embodiment.

FIG. 7 is a detailed diagram illustrating a method of generating the event data EDT1_1, according to at least one example embodiment. Hereinafter, FIG. 7 and FIG. 3 will be discussed together, but the example embodiments are not limited thereto. FIG. 7 illustrates a method of generating the event data EDT1_1 by the sensing circuit 110*a*, but is not limited thereto. FIG. 7 illustrates a method of generating the event data EDT1_1 by the event generator 170*a*, but is not limited thereto. In FIG. 7, image data corresponding to each of the plurality of pixels included in the pixel array 130*a* is schematically illustrated. For example, a first pixel PX1 portion of the second image data IDT2_1 may mean the second image data IDT2_1 corresponding to the first pixel PX1 of the pixel array 130a, etc. The first pixel PX1 portion of a first conversion image data CDT2_1 may mean the first conversion image data CDT2_1 corresponding to the first pixel PX1 of the pixel array 130a, etc. The first pixel PX1 portion of difference data DIT may mean the difference data DIT corresponding to the first pixel PX1 of the pixel array 130a, etc. The first pixel PX1 portion of the event data EDT1_1 may mean the event data EDT1_1 corresponding to the first pixel PX1 of the pixel array 130a, etc. In FIG. 7, a pixel array is illustrated to include 5×5 pixels, but this is for convenience of explanation and is not limited thereto, and the pixel array may be a different size and/or have a different arrangement, etc. Duplicate descriptions given with reference to FIG. 6 are omitted.

The event generator 170a may convert second image data (for example, IDT2_1 and IDT2_2) of each of the plurality of sub-frames to generate converted image data (for example, CDT2_1 and CDT2_2), etc. The event generator 170a may convert second image data of each of the plurality of sub-frames corresponding to the first exposure time to generate converted image data of each of the plurality of sub-frames. For example, the event generator 170a may convert the second image data IDT2_1 of the first sub-frame to generate the first conversion image data CDT2_1 of the first sub-frame, etc. The event generator 170a may convert the second image data IDT2_2 of the second sub-frame to generate second conversion image data CDT2_2 of the second sub-frame, etc.

The event generator 170a may convert the second image data IDT2_1 and IDT2_2 of each of the plurality of sub-frames into gray scale to represent the intensity of light, and converts a result of the gray scale conversion into a log scale to generate the first and second conversion image data CDT2_1 and CDT2_2, but the example embodiments are not limited thereto. For example, the first conversion image data CDT2_1 may include image data in which the second image data IDT2_1 is gray-scale converted and then log-scale converted, etc. The second conversion image data CDT2_2 may include image data in which the second image data IDT2_2 is gray-scale converted and then log-scale converted, etc.

The event generator 170a may convert second image data corresponding to each of the plurality of pixels. The first conversion image data CDT2_1 corresponding to the first pixel PX1 may have a value obtained by performing gray-scale conversion and then log-scale conversion on the second image data IDT2_1 corresponding to the first pixel PX1, etc. The first pixel PX1 of the second image data IDT2_1 may represent RGB data, and the first pixel PX1 of the first conversion image data CDT2_1 may represent luminance data, but the example embodiments are not limited thereto. The second conversion image data CDT2_2 corresponding to the first pixel PX1 may have a value obtained by performing gray-scale conversion and log-scale conversion on the second image data IDT2_2 corresponding to the first pixel PX1, but is not limited thereto.

The event generator 170a may generate difference data corresponding to conversion image data of each of the plurality of sub-frames and conversion image data of at least one reference frame corresponding to each of the plurality of sub-frames, but is not limited thereto. The event generator 170a may generate the difference data DIT corresponding to the first sub-frame based on the difference (e.g., change and/or differences in pixel values, etc.) between the first conversion image data CDT2_1 of the first sub-frame and the second conversion image data CDT2_2 of the second sub-frame, etc. The second sub-frame may include the reference frame of the first sub-frame.

The event generator 170a may compare differences between each of the plurality of pixels in the conversion image data (for example, CDT2_1 and CDT2_2, etc.) to generate the difference data DIT. For example, the event generator 170a may generate the difference data DIT corresponding to the first pixel PX1, which represents the difference between the first conversion image data CDT2_1 corresponding to the first pixel PX1 and the second conversion image data CDT2_2 corresponding to the first pixel PX1, etc.

The event generator 170a may generate the event data EDT1_1 corresponding to each of the plurality of sub-frames based on the difference data DIT. The event generator 170a may generate event data EDT1_1 of each of the plurality of sub-frames based on the comparison between the difference data DIT of each of the plurality of sub-frames and a desired and/or preset threshold value. The event generator 170a may generate event data EDT1_1 of the first sub-frame based on the comparison between the difference data DIT of the first sub-frame and the threshold value, etc.

The event generator 170a may compare the difference data DIT of each of the plurality of sub-frames with a desired and/or preset threshold value in units of pixels. The event generator 170a may generate the event data EDT1_1 of the first sub-frame by comparing a difference value (e.g., change and/or differences in pixel values, etc.) corresponding to each of the plurality of pixels included in the difference data DIT of the first sub-frame with a desired and/or preset threshold value, etc. For example, the event generator 170a may generate the event data EDT1_1 corresponding to the first pixel PX1 by comparing the difference data DIT corresponding to the first pixel PX1 with a threshold value, etc.

In at least one example embodiment, the size of event data corresponding to pixel units may be 1 bit, but is not limited thereto. For example, the event generator 170a may generate, as a "1" value, the event data EDT1_1 corresponding to the first pixel PX1, when the difference data DIT corresponding to the first pixel PX1 is equal to or greater than a desired threshold value, but the example embodiments are not limited thereto. The event generator 170a may generate, as a "0" value, the event data EDT1_1 corresponding to the first pixel PX1, when the difference data DIT corresponding to the first pixel PX1 is less than a threshold value, but the example embodiments are not limited thereto.

Figure 8:
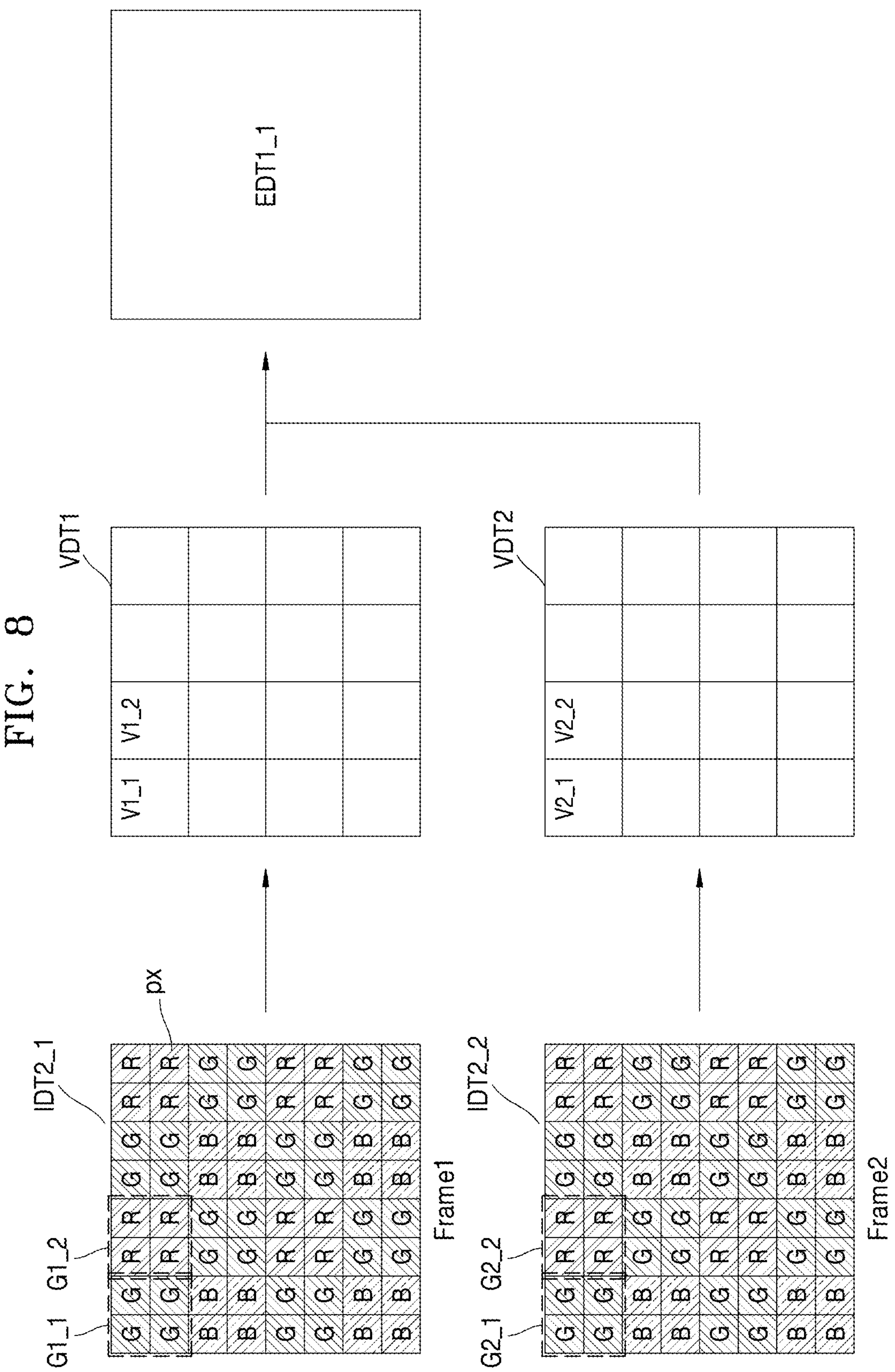
FIG. 8 is a diagram of second image data according to at least one example embodiment.

FIG. 8 is a diagram of the second image data IDT2_1 according to at least one example embodiment. Hereinafter, FIG. 8 and FIG. 3 will be discussed together, but the example embodiments are not limited thereto. FIG. 8 illustrates a method of generating the event data EDT1_1 by the sensing circuit 110a. FIG. 8 illustrates a method of generating the event data EDT1_1 by the event generator 170a. In FIG. 8, image data corresponding to each of the plurality of pixels included in the pixel array 130a is schematically illustrated. Duplicate descriptions to the descriptions given above are omitted.

Referring to FIG. 8, the second image data IDT2_1 is schematically illustrated to correspond to each of the plurality of pixels of the pixel array 130a, but the example embodiments are not limited thereto. FIG. 8 illustrates that 8×8 or 64 pixels PX are included in the second image data IDT2_1, but this is for convenience of explanation, and the number of pixels PX is not limited thereto. In addition, referring to FIG. 8, the second image data IDT2_1 is illustrated to include green pixels, red pixels, and blue pixels, but is not limited thereto.

The event generator 170*a* may group the second image data of each of the plurality of sub-frames into units of k (where k is a positive integer) pixels, but the example embodiments are not limited thereto. The event generator 170*a* may group the second image data IDT2_1 of the first sub-frame in units of k pixels. The event generator 170*a* may group the second image data IDT2_2 of the first sub-frame in units of k pixels. For example, the event generator 170*a* may group image data in units of four pixels, etc. The event generator 170*a* may generate a first group G1_1 by grouping the second image data IDT2_1 in units of four pixels. The first group G1_1 may include the second image data IDT2_1 corresponding to each of a first green pixel, a second green pixel, a third green pixel, and a fourth green pixel, etc.

The event generator 170*a* may generate a first group G2_1 by grouping the second image data IDT2_2 in units of four pixels, but is not limited thereto. The first group G2_1 may include the second image data IDT2_2 corresponding to each of the first green pixel, the second green pixel, the third green pixel, and the fourth green pixel, etc.

The event generator 170*a* may generate event data for each of the plurality of sub-frames based on the second image data of each of the plurality of sub-frames and the reference frame corresponding to each of the plurality of sub-frames, in units of grouped pixels, but the example embodiments are not limited thereto. For example, the event generator 170*a* may generate the event data EDT1_1 of the first sub-frame based on the second image data IDT2_1 of the grouped first sub-frame and the second image data IDT2_2 of the grouped second sub-frame, etc.

The event generator 170*a* may group the second image data into k pixel units, calculate characteristic values of the second image data values corresponding to k pixels included in the same group, and generate first and second characteristic value data VDT1 and VDT2, etc. The characteristic value may include at least one of an average value (mean), a maximum value (max), and/or a medium value (median), etc., of the second image data values corresponding to each of k pixels included in the same group, but is not limited thereto. For example, the event generator 170*a* may calculate a characteristic value V1_1 based on the second image data IDT2_1 corresponding to each of the first green pixel, the second green pixel, the third green pixel, and the fourth green pixel included in the first group G1_1 of the second image data IDT2_1, etc. The event generator 170*a* may calculate a characteristic value V1_2 based on the second image data IDT2_1 corresponding to each of a first red pixel, a second red pixel, a third red pixel, and a fourth red pixel included in a second group G1_2 of the second image data IDT2_1, etc.

The event generator 170*a* may calculate a characteristic value V2_1 based on the second image data IDT2_2 corresponding to each of a first green pixel, a second green pixel, a third green pixel, and a fourth green pixel included in the first group G2_1 of the second image data IDT2_2, etc. The event generator 170*a* may calculate a characteristic value V2_2 based on the second image data IDT2_2 corresponding to each of a first red pixel, a second red pixel, a third red pixel, and a fourth red pixel included in a second group G2_2 of the second image data IDT2_2, etc.

The event generator 170*a* may generate event data based on the first and second characteristic value data VDT1 and VDT2, but is not limited thereto. The event generator 170*a* may generate the event data EDT1_1 based on the first characteristic value data VDT1 of the first sub-frame, etc. The event generator 170*a* may convert the first characteristic value data VDT1 of the first sub-frame to generate first conversion image data, and may convert the second characteristic value data VDT2 of a second sub-frame to generate second conversion image data.

As described in FIG. 7, the event generator 170*a* may convert each of the first characteristic value data VDT1 of the first sub-frame and the second characteristic value data VDT2 of the second sub-frame by using gray scale conversion and/or log scale conversion, etc., but is not limited thereto. The event generator 170*a* may compare the first conversion image data of the first sub-frame with the second conversion image data of the second sub-frame to generate difference data of the first sub-frame. The event generator 170*a* may generate event data EDT1_1 of the first sub-frame based on the difference data DIT of the first sub-frame.

The image sensor 100*a* may generate characteristic value data by grouping image data into units of k pixels. The image sensor 100*a* may reduce the size of the event data by generating event data based on characteristic value data, and thus, may reduce data transmission delay when transmitting event data.

Figure 9:
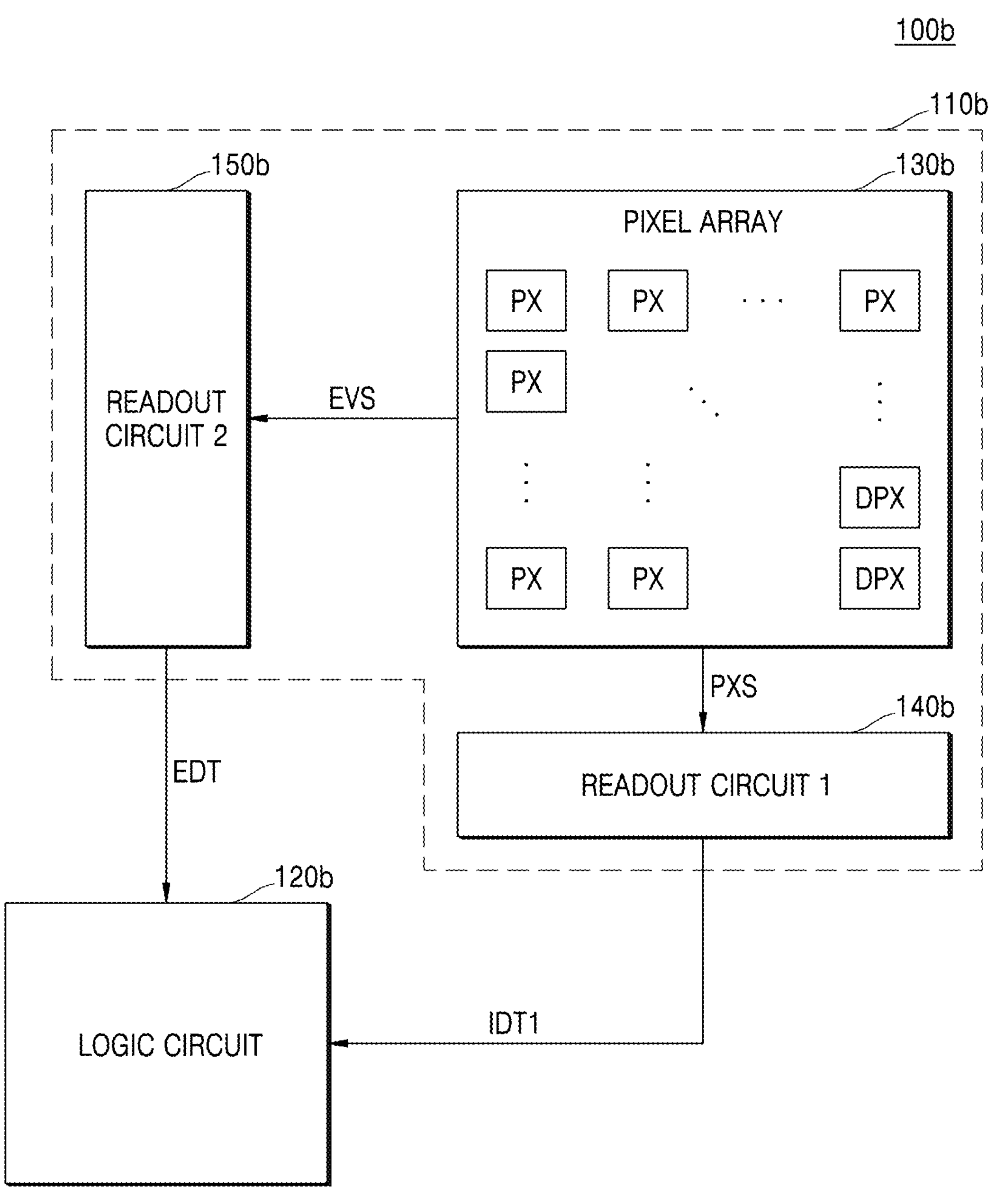
FIG. 9 is a diagram of an image sensor according to at least one example embodiment.

FIG. 9 is a diagram of an image sensor 100*b* according to at least one example embodiment. The image sensor 100*b*, a sensing circuit 110*b*, and a logic circuit 120*b* in FIG. 9 may respectively correspond to the image sensor 100, the sensing circuit 110, and the logic circuit 120 in FIG. 1, and thus, duplicate descriptions thereof are omitted, but the example embodiments are not limited thereto.

Referring to FIG. 9, the image sensor 100*b* may include the sensing circuit 110*b* and/or the logic circuit 120*b*, but the example embodiments are not limited thereto. The sensing circuit 110*b* may include a pixel array 130*b*, a first readout circuit 140*b*, and a second readout circuit 150*b*. However, the example embodiments are not necessarily limited thereto, and other components may be further included as desired and/or necessary. According to some example embodiments, one or more of the image sensor 100*b*, the sensing circuit 110*b*, the logic circuit 120*b*, the first readout circuit 140*b*, and/or the second readout circuit 150*b*, etc., may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The pixel array 130*b* may include a plurality of pixels. The plurality of pixels may include at least one CIS pixel PX and/or at least one DVS pixel DPX, etc. The CIS pixel PX may convert at least one optical signal into at least one electrical signal to generate the pixel signal PXS. The DVS pixel DPX may generate at least one event signal EVS by sensing a change in intensity of the optical signal. The DVS pixel DPX may detect at least one event, that is a change in intensity of incident light, and output at least one event signal.

The first readout circuit 140*b* may generate the first image data IDT1 based on the pixel signal PXS. The first readout circuit 140*b* may generate the first image data IDT1 during the first exposure time. The first readout circuit 140*b* may generate the first image data IDT1 of a low frame rate based on the first exposure time, but is not limited thereto. Because the first readout circuit 140*b* generates the first image data IDT1 of the main frame based on the pixel signal PXS during the first exposure time, the first image data IDT1 of a low frame rate may be generated.

The second readout circuit 150*b* may generate the event data EDT based on the event signal EVS generated by the DVS pixel DPX. The second readout circuit 150*b* may generate the event data EDT of a high frame rate based on the first exposure time, but is not limited thereto. The second readout circuit 150*b* may generate the event data EDT in units of sub-frames based on the event signal EVS, but is not limited thereto. For example, the second readout circuit 150*b* may generate the event data EDT including information related to and/or corresponding to an event occurring during the first exposure time in units of sub-frames at desired and/or preset time points, etc.

Because the second readout circuit 150*b* generates the event data EDT of a high frame rate in units of sub-frames at desired and/or preset time points during the first exposure time, the event data EDT of a high frame rate may be generated. The second readout circuit 150*b* may scan the DVS pixels during a desired and/or preset period to output the event data EDT corresponding to the first exposure time. An interval in which the first image data IDT1 is output during the first exposure time may be longer than a period in which the event data EDT is output, but the example embodiments are not limited thereto. The first image data IDT1 at a relatively low frame rate may be generated, and the event data EDT at a relatively high frame rate may be generated, but the example embodiments are not limited thereto.

The logic circuit 120*b* may receive the first image data IDT1 and/or the event data EDT, etc. The logic circuit 120*a* may sequentially pack the first image data IDT1 corresponding to the first exposure time and the event data EDT corresponding to the first exposure time, and generate the output data based on the sequentially packed first image data IDT1 and the event data EDT. For example, the logic circuit 120*a* may sequentially pack both the first image data IDT1 of a low frame rate and the event data EDT of a high frame rate, but the example embodiments are not limited thereto.

Figure 10:
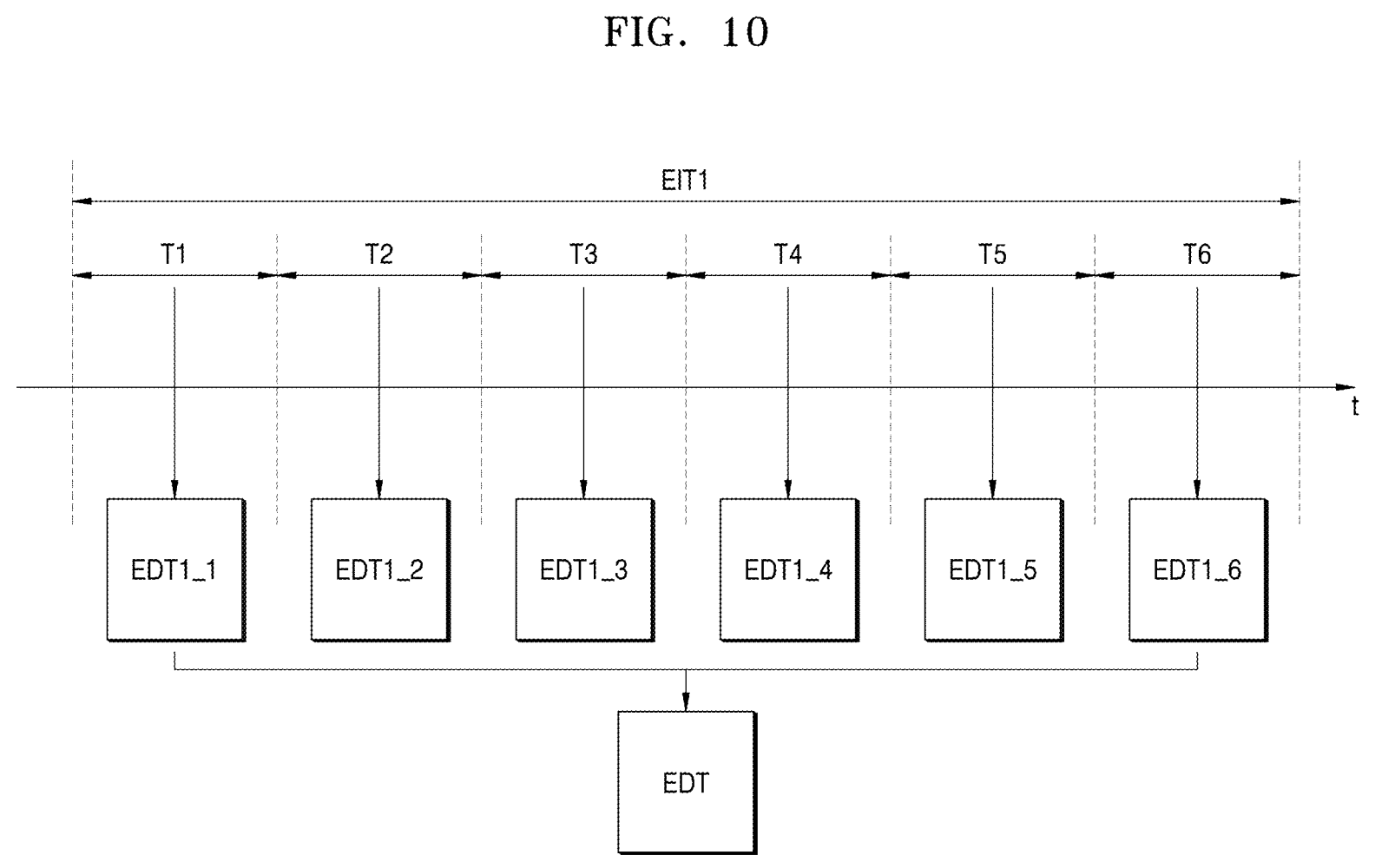

FIG. 10 is a diagram of the event data EDT corresponding to the first exposure time EIT1, according to at least one example embodiment. Hereinafter, FIG. 10 and FIG. 9 are discussed together, but the example embodiments are not limited thereto. The sensing circuit 110*b* may generate the event data EDT. The second readout circuit 150*b* may generate the event data EDT.

Referring to FIG. 10, the second readout circuit 150*b* may generate the event data EDT in units of sub-frames based on the event signal EVS. The second readout circuit 150*b* may generate event data EDT including information related to and/or corresponding to an event occurring within the first exposure time EIT1 at desired and/or preset time points. For example, the first exposure time EIT1 may include six time intervals, but is not limited thereto. The first exposure time EIT1 may include a plurality of time intervals, e.g., a first time interval T1, a second time interval T2, a third time interval T3, a fourth time interval T4, a fifth time interval T5, and/or a sixth time interval T6, etc. Although the first exposure time EIT1 is illustrated to include six time intervals in FIG. 10, the example embodiments are not limited thereto.

The second readout circuit 150*b* may generate event data EDT of a sub-frame corresponding to each of a plurality of time intervals. For example, the second readout circuit 150*b* may generate the event data EDT1_1 corresponding to the first time interval T1. The second readout circuit 150*b* may generate the event data EDT1_2 corresponding to the second time interval T2. The second readout circuit 150*b* may generate event data EDT1_3 corresponding to the third time interval T3.

The second readout circuit 150*b* may generate event data of each of the plurality of time intervals included in the first exposure time at a high frame rate, but is not limited thereto. The event data EDT1_1 of the first time interval T1, the event data EDT1_2 of the second time interval T2, the event data EDT1_3 of the third time interval T3, event data EDT1_4 of the fourth time interval T4, event data EDT1_5 of the fifth time interval T5, and/or event data EDT1_6 of the sixth time interval T6, etc., may be generated as the entire event data EDT.

Figure 11:
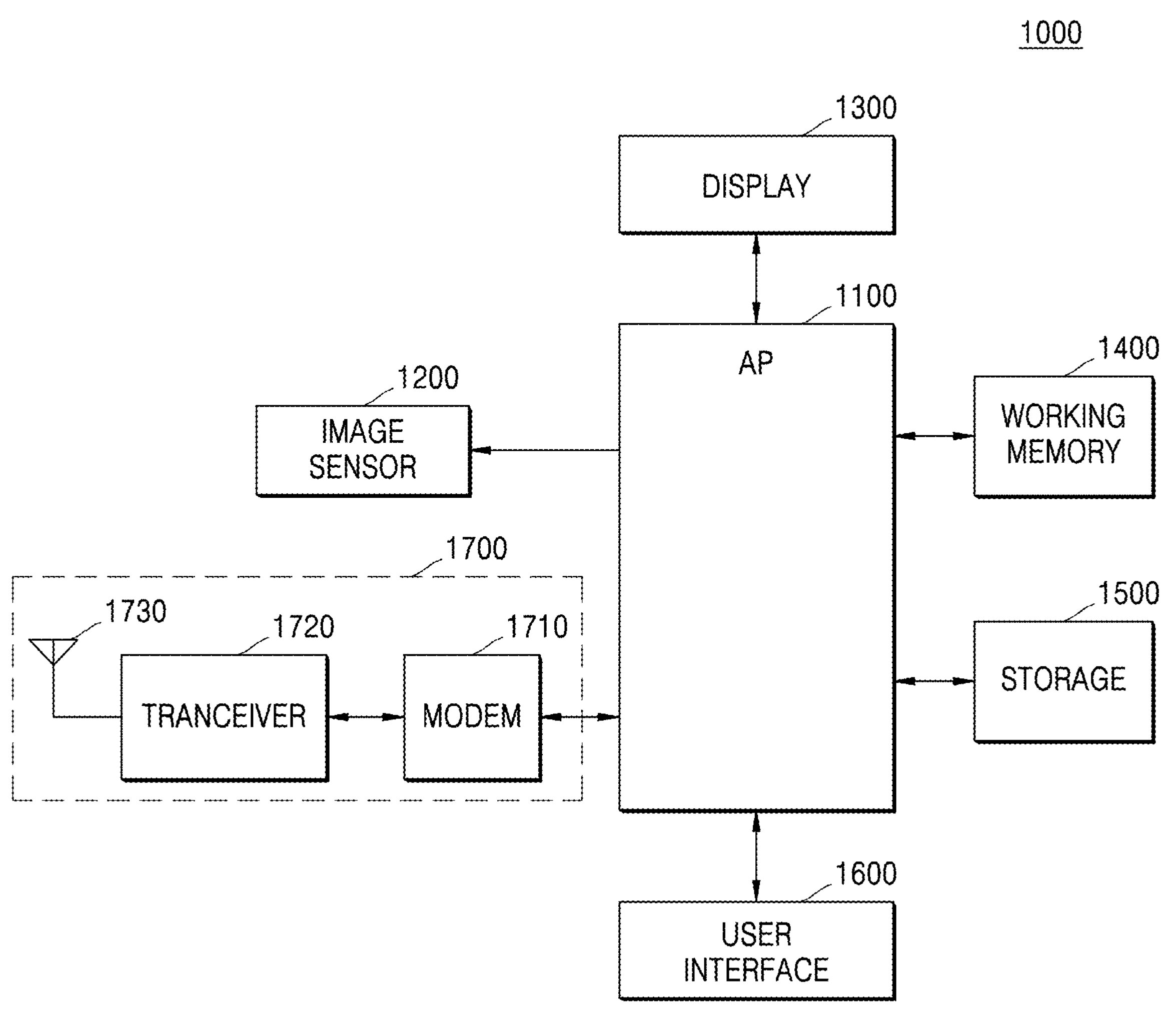
FIG. 11 is a block diagram of an electronic device according to at least one example embodiment.

FIG. 11 is a block diagram of an electronic device 1000 according to at least one example embodiment. For example, the electronic device 1000 may include a mobile terminal, but is not limited thereto.

Referring to FIG. 11, the electronic device 1000 according to at least one example embodiment may include an application processor (AP) 1100, an image sensor 1200, a display device 1300, a working memory 1400, a storage 1500, a user interface 1600, and/or a wireless transceiver 1700, etc., but is not limited thereto. The descriptions of the image sensors and the operation methods of the image sensors according to example embodiments of the inventive concepts described with reference to FIGS. 1 through 10 may be applied to the image sensor 1200, but the example embodiments are not limited thereto.

The AP 1100 may be provided as, for example, a system-on-chip (SoC) which controls the overall operation of the electronic device 1000 and/or drives an application program, an operating system, etc.

The AP 1100 may receive the output data from the image sensor 1200. The AP 1100 may receive the output data od, in which the first image data and event data are packed, from the image sensor 1200. The AP 1100 may perform at least one image processing operation on the output data od, and generate output image data based on the results of the image processing operation and the output data od. The AP 1100 may provide the output image data to the display device 1300 and/or store the output image data in the storage 1500, etc. The AP 1100 may receive the output data od in which first image data of a low frame rate and event data of a high frame rate are packed. The AP 1100 may restore the first image data of a high frame rate based on the event data. The AP 1100 may perform, for example, image deblur processing on the first image data based on the event data, but is not limited thereto.

The image sensor 1200 may generate image data, such as raw image data (e.g., initial image data, etc.), based on the received optical signal, and provide the image data to the AP 1100. The image sensor 1200 may sequentially pack the first image data of a low frame rate and the event data of a high frame rate, but the example embodiments are not limited thereto.

The working memory 1400 may be implemented as a volatile memory, such as DRAM and/or SRAM, etc., and/or a resistive non-volatile memory, such as FeRAM, RRAM, RRAM, etc., but the example embodiments are not limited thereto. The working memory 1400 may store programs and/or data, which the AP 1100 executes and/or processes, etc.

The storage 1500 may be implemented as a non-volatile memory, such as a NAND flash memory and/or resistive memory, etc., and the storage 1500 may be provided as, for example, a memory card (a multi-media card (MMC), an embedded MMC (eMMC), a secure card (SD), and a micro SD), etc. The storage 1500 may store data and/or programs for execution, algorithms for controlling the image processing operation of an image processing device 1110, and the data and/or programs may be loaded into the working memory 1400 when the image processing operation is performed. The AP 1100 may include image processing device, but the example embodiments are not limited thereto. In at least one example embodiment, the storage 1500 may store output image data generated by the image processing device, such as converted image data and/or post-processed image data, etc.

The user interface 1600 may be implemented as various devices capable of receiving a user input, such as a keyboard, a curtain key panel, a touch panel, a finger print sensor, and/or a microphone, etc. The user interface 1600 may receive the user input and provide a signal corresponding to the received user input to the AP 1100, etc.

The wireless transceiver 1700 may include a transceiver 1720, a modem 1710, and/or an antenna 1730, etc., but is not limited thereto.

While various example embodiments of the inventive concepts has been particularly shown and described, it will be understood that various changes in form and details may be made therein without departing from the spirit and scope of the following claims.

What is claimed is:

1. An image sensor comprising:

a plurality of pixels; and processing circuitry configured to, generate first image data by converting optical signals received by each of the plurality of pixels during a first exposure time into electrical signals, generate event data including information related to a change in intensity of the optical signals received by each of the plurality of pixels during the first exposure time, the event data having a frame rate greater than a frame rate of the first image data, receive the first image data and the event data, and generate output data by sequentially packing the first image data and the event data corresponding to the first exposure time, wherein the processing circuitry is further configured to, generate second image data corresponding to a plurality of sub-frames of an image frame, the plurality of sub-frames corresponding to a plurality of sub-exposure times included in the first exposure time, merge at least a portion of the second image data corresponding to each of the plurality of sub-frames to generate the first image data, and generate the event data corresponding to each of the plurality of sub-frames based on the second image data generated from the plurality of sub-frames and the second image data generated from at least one reference frame continuous with each of the plurality of sub-frames.

2. The image sensor of claim 1, further comprising:

a memory configured to store the second image data.

3. The image sensor of claim 2, wherein the processing circuitry is further configured to:

receive the at least a portion of the second image data corresponding to each of the plurality of sub-frames from the memory.

4. The image sensor of claim 1, wherein the processing circuitry is further configured to:

generate conversion image data corresponding to each of the plurality of sub-frames based on the second image data corresponding to each of the plurality of sub-frames;

generate difference data corresponding to each of the plurality of sub-frames, the difference data representing differences between the conversion image data of each sub-frame and conversion image data of a reference frame of the respective sub-frame; and generate the event data corresponding to each of the plurality of sub-frames based on the difference data.

5. The image sensor of claim 4, wherein the processing circuitry is further configured to:

convert the second image data corresponding to each of the plurality of sub-frames into gray scale;

convert a result of the conversion into gray scale into a log scale; and generate the conversion image data corresponding to each of the plurality of sub-frames.

6. The image sensor of claim 4, wherein the processing circuitry is further configured to:

generate the event data corresponding to each of the plurality of sub-frames by comparing the difference data corresponding to each of the plurality of sub-frames with a desired threshold value.

7. The image sensor of claim 4, wherein the processing circuitry is further configured to:

compare the difference data corresponding to each of the plurality of sub-frames with a desired threshold value in units of pixels, wherein a size of the event data corresponding to the unit of pixels is 1 bit.

8. The image sensor of claim 1, wherein the processing circuitry is further configured to:

group the second image data of each of the plurality of sub-frames in units of k pixels, wherein k is a positive integer greater than or equal to 2; and in units of grouped pixels, generate the event data corresponding to each of the plurality of sub-frames based on the second image data corresponding to each of the plurality of sub-frames and the second image data of a reference frame corresponding to each of the plurality of sub-frames.

9. The image sensor of claim 1, wherein the plurality of pixels comprise, at least one complementary metal-oxide semiconductor (CMOS) image sensor (CIS) pixel configured to convert the optical signals into the electrical signals, and at least one dynamic vision sensor (DVS) pixel configured to sense the change in intensity of the optical signals; and the processing circuitry is further configured to, generate the first image data using the at least one CIS pixel of the plurality of pixels, and generate the event data using the at least one DVS pixel.

10. The image sensor of claim 9, wherein the processing circuitry is further configured to:

generate the event data in units of sub-frames at desired time points; and generate the output data by sequentially packing the first image data and the event data during the first exposure time.

11. An image sensor comprising:

processing circuitry configured to generate initial image data in units of sub-frames by reading out electrical signals from a pixel array, the pixel array including a plurality of pixels each configured to convert optical signals into the electrical signals; and a memory configured to store the initial image data, wherein the processing circuitry is further configured to, generate first image data based on the initial image data, the generating the first image data including merging the initial image data of each of m sub-frames included in a frame according to a plurality of sub-exposure times included in a first exposure time associated with the frame, wherein m is a positive integer, generate event data corresponding to each of the m sub-frames based on the initial image data corresponding to each of the m sub-frames, and generate output data by sequentially packing the first image data and the event data.

12. The image sensor of claim 11, wherein the processing circuitry is further configured to:

merge the initial image data using a first frame rate;

generate the first image data based on the merged initial image data, the first image data having a second frame rate which is less than the first frame rate; and pack the first image data of the second frame rate and the event data, the event data having the first frame rate.

13. The image sensor of claim 11, wherein the m sub-frames comprise a first sub-frame and a second sub-frame continuous with the first sub-frame; and the processing circuitry is further configured to generate the event data corresponding to the first sub-frame based on the initial image data corresponding to the first sub-frame and the second sub-frame.

14. The image sensor of claim 13, wherein the processing circuitry is further configured to:

convert the initial image data corresponding to the first sub-frame and the initial image data corresponding to the second sub-frame to generate conversion image data;

generate difference data representing differences between the conversion image data corresponding to the first sub-frame and the conversion image data corresponding to the second sub-frame; and generate the event data corresponding to the first sub-frame based on the difference data.

15. The image sensor of claim 14, wherein the processing circuitry is further configured to:

convert the initial image data corresponding to the first sub-frame and the initial image data corresponding to the second sub-frame into gray scale;

convert a result of the conversion into gray scale into a log scale; and generate the conversion image data corresponding to the first sub-frame and the conversion image data corresponding to the second sub-frame.

16. The image sensor of claim 14, wherein the difference data includes difference values corresponding to each pixel of the plurality of pixels; and the processing circuitry is further configured to:

compare the difference values corresponding to each pixel of the plurality of pixels with a desired threshold value to generate the event data corresponding to the first sub-frame.

17. The image sensor of claim 13, wherein the processing circuitry is further configured to:

group the initial image data corresponding to the first sub-frame and the initial image data corresponding to the second sub-frame in units of k pixels, wherein k is a positive integer greater than or equal to 2; and generate the event data corresponding to the first sub-frame based on the grouped initial image data corresponding to the first sub-frame and the grouped initial image data corresponding to the second sub-frame.

18. An image sensor comprising:

a pixel array including at least one complementary metal-oxide semiconductor (CMOS) image sensor (CIS) pixel and at least one dynamic vision sensor (DVS) pixel, the at least one CIS pixel configured to convert optical signals into electrical signals, and the at least one DVS pixel configured to generate event signals by sensing a change in intensity of the optical signals; and processing circuitry configured to, generate first image data based on the electrical signals, the first image data having a first frame rate, generate event data based on the event signals, the event data having a second frame rate higher than the first frame rate of the first image data, and generate output data by sequentially packing the first image data and the event data corresponding to an exposure time of the first image data-, wherein the processing circuitry is further configured to, generate second image data corresponding to a plurality of sub-frames of an image frame, the plurality of sub-frames corresponding to a plurality of sub-exposure times included in a first exposure time associated with the first image data, merge at least a portion of the second image data corresponding to each of the plurality of sub-frames to generate the first image data, and generate the event data corresponding to each of the plurality of sub-frames based on the second image data generated from the plurality of sub-frames and the second image data generated from at least one reference frame continuous with each of the plurality of sub-frames.

19. The image sensor of claim 18, wherein the processing circuitry is further configured to:

generate conversion image data corresponding to each of the plurality of sub-frames based on the second image data corresponding to each of the plurality of sub-frames;

generate difference data corresponding to each of the plurality of sub-frames, the difference data representing differences between the conversion image data of each sub-frame and conversion image data of a reference frame of the respective sub-frame; and generate the event data corresponding to each of the plurality of sub-frames based on the difference data.

20. The image sensor of claim 19, wherein the processing circuitry is further configured to:

convert the second image data corresponding to each of the plurality of sub-frames into gray scale;

convert a result of the conversion into gray scale into a log scale; and generate the conversion image data corresponding to each of the plurality of sub-frames.

* * * * *